United States Patent [19]

Shwartz et al.

[11] Patent Number: 5,197,005
[45] Date of Patent: Mar. 23, 1993

[54] DATABASE RETRIEVAL SYSTEM HAVING A NATURAL LANGUAGE INTERFACE

[75] Inventors: Steven Shwartz, Orange; Claudio Fratarcangeli, Trumbull; Richard E. Cullingford, Monroe; Gregory S. Aimi, North Haven; Donald P. Strasburger, Stratford, all of Conn.

[73] Assignee: Intelligent Business Systems, Milford, Conn.

[21] Appl. No.: 345,966

[22] Filed: May 1, 1989

[51] Int. Cl.$^5$ .............................................. G06F 15/40
[52] U.S. Cl. ................................... 364/419; 395/600; 364/DIG. 1; 364/274; 364/274.2; 364/274.3; 364/274.8
[58] Field of Search ........ 364/513, 419, 200 MS File, 364/900 MS File; 395/600, 12

[56] References Cited

U.S. PATENT DOCUMENTS

| | | | |
|---|---|---|---|
| 4,736,296 | 4/1988 | Katayama et al. | 364/419 |
| 4,811,207 | 3/1989 | Hikita et al. | 364/900 |
| 4,839,853 | 6/1989 | Deerwester et al. | 364/900 |
| 4,914,590 | 4/1990 | Loatman et al. | 364/419 |
| 4,930,071 | 5/1990 | Tou et al. | 314/300 |
| 4,931,935 | 6/1990 | Ohira et al. | 364/419 |
| 4,943,933 | 7/1990 | Miyamoto et al. | 364/513 |
| 4,974,191 | 11/1990 | Amirghodsi et al. | 395/700 |
| 4,994,967 | 2/1991 | Asakawa | 364/419 |

FOREIGN PATENT DOCUMENTS

63-219034 9/1988 Japan .

OTHER PUBLICATIONS

Winston, "Natural Language Understanding", *Artificial Intelligence*, CH. 9, pp. 291–334.
Rich, "Natural Language Interfaces", *IEEE Computer*, Sep. 1984, pp. 39–47.
Kao et al., Providing Quality Responses with Natural Language Interfaces: the Null Value Problem, IEEE Trans. Software Eng., vol. 14, No. 7, 1988.
"Natural Language Interfaces: Benefits, Requirements, State of the Art and Applications", by John L. Manferdelli, *A. I. East*, Oct. 1987.
"Inside Computer Understanding", Schank and Riesbeck, Erlbaum Press, 1981, Chapter 14.
"The LIFER Manual: A Guide to Building Practical Natural Language Interfaces", by Gary G. Hendrix, SRI International, Technical Note 138, Feb. 1977.
"Human Engineering for Applied Natural Language Processing", by Gary G. Hendrix, *SRI International*, Technical Note 139, Feb. '77.
"Applied Natural Language Processing", Shwartz, Steven C., Petrocelli Books, Princeton, N.J., 1987.

*Primary Examiner*—Michael R. Fleming
*Assistant Examiner*—Debra A. Chun
*Attorney, Agent, or Firm*—Barry R. Lipsitz

[57] ABSTRACT

A database retrieval system having a natural language interface is provided. A database developer creates a knowledge base containing a structural description and semantic description of an application database from which data is to be retrieved. A database independent, canonical internal meaning representation of a natural language query is produced. An expert system accesses structural and semantic description information in the knowledge base and, in accordance with predefined rules, identifies database elements from said information that are necessary to satisfy the query represented by the internal meaning representation. A database query is generated among the database elements, enabling the retrieval and aggregation of data from the database to satisfy the natural language query. A debugging facility derives an external meaning representation from the internal meaning representation. The external meaning representation is database-independent, canonical, and easily understandable to the database developer. The external meaning representation enables the database developer to comprehend the internal meaning representation and verify that a natural language query is properly interpreted by the system to effect the accurate retrieval and aggregation of data from the database. The external meaning representation comprises entities and constraints relating to the entities, without reference to factual or linguistic relationships between entities that would prevent the external meaning representation from being easily understood.

41 Claims, 11 Drawing Sheets

Microfiche Appendix Included
(11,603 Microfiche, 47 Pages)

DATABASE RETRIEVAL SYSTEM HAVING A NATURAL LANGUAGE INTERFACE

This application includes a microfiche appendix, having 47 fiche with a total of 11,603 frames.

BACKGROUND OF THE INVENTION

The present invention relates to a database retrieval system, and more particularly to such a system having a natural language interface.

Business managers and staff require information to run their companies. Data processing departments of companies have been attempting to meet this information need since the early 1950's. The record keeping of most organizations is now computerized, and an abundance of data of all kinds, often describing transactions in minute detail, resides on the central computers of these organizations. In theory, all this data is available for review by employees of such companies. In practice, however, users of such information have faced serious obstacles in retrieving the information they need.

A frequent response to a user s request for data from a database is that the data is not stored in a way that enables it to be used to meet a user's need. Additionally, the complexity of current database systems requires a trained specialist to figure out how the data requested by a user can be retrieved from the database. This specialist must interpret the user's request or "query", determine exactly what it is the user is looking for, and figure out how to get that information from the database. Then, once the data is retrieved, it must be formatted into a report that the user can use and understand.

In recent years, a type of database known as a "relational database" has come into widespread use within the business community. An "entity-relationship" model is often used when mapping a real world system to a relational database management system. The entity-relationship model characterizes all elements of a system as either an entity (e.g., a person, place, or thing) or a relationship between entities. Both constructs are represented by the same structure, referred to as a "table".

A table is a collection of data organized into rows and columns, and represents a unit of a relational database. In an order-entry system, for example, entities will include parts and orders. Such information may be represented in two different tables. The relationship of which parts are requested by an order may be represented by a third table.

Thus, in applying the entity-relationship model, the entities of a system are identified and tables are constructed to represent entities. Then, relationships between the entities are identified and the current tables are extended (or new tables created) to represent these relationships. Finally, the attributes of each entity are identified and the tables are extended to include such attributes. Those skilled in the art are well familiar with the application of the entity-relationship model to relational database management systems.

In recent years, there have been proposals for providing a natural language interface to relational databases. An English language interface, for example, would enable unskilled users of a database to query the database for desired information, and receive such information without the need to rely on a trained specialist to interpret the query, access the database, generate a report, and communicate the report to the end user. Thus, a natural language interface would save enormous time and money for companies using relational databases, and would enable users with little or no computer experience to use a sophisticated database system by merely inputting (e.g., via a keyboard) a natural language (e.g., English) question.

An example of a natural language interface proposed in the past can be found in the article entitled *Natural Language Interfaces: Benefits, Requirements, State of the Art and Applications*, by John L. Manferdelli, *A.I. East*, October, 1987. This article describes a system in which an English sentence is converted into a grammatical structure ("parsed"), much like a sentence diagram. The diagrammed sentence is then translated into a "representation language" that is a hybrid of a semantic network and first order predicate logic. The representation represents time dependent facts, quantified statements, tense information and general sets, and is based on concepts contained in the original English sentence.

The representation language provided by the prior art system referenced above is complex, and not easily understandable even to a skilled user of the system. Thus, it is difficult for such a system to be implemented as a general purpose interface for any application database that might be desired. Customization of the interface to specific application databases was difficult and time consuming, and no means were provided for enabling a skilled user to easily comprehend the representation language produced by the natural language interface for a given query. Without such means, the building and testing of an interface for a particular application is extremely difficult and costly.

Various other articles have been published concerning software that is currently available to enable a natural language, such as English, to be translated into a representation language that can be used by a computer system to respond to a natural language query. For example, a program known as "McELI" is available for this purpose and discussed in *Inside Computer Understanding*, Schank and Riesbeck, Erlbaum Press, 1981. Another program known as "LIFER" is described in the article *LIFER: A Natural Language Interface Facility*, by Gary G. Hendrix, *SIGART Newsletter*, Issue 61, 1977, pp. 25-26. Each of these programs will translate a natural language into another formal syntax, such as a representation language. However, to date the representation language syntaxes have been complicated and difficult to understand. Therefore, no means have been available to enable anyone but the most sophisticated computer programmers to utilize such languages in providing a natural language interface capability to desired applications, such as the retrieval of information from a database.

A particular problem in providing a natural language interface for a database resides in enabling the system to locate data responsive to a natural language query regardless of the words used in the original query. A primary objection of end users of most prior art database retrieval systems is that they have to learn the names of the database elements, i.e., if the term "salary" is used in the database, the end user would have to use the same term in order to retrieve salary information, and could not use synonyms such as "wage", "earns", "makes", or "pay". This problem is referred to as the "synonym problem".

Some products have attempted to solve this problem by having the system programmers define all of the synonyms that can be thought of for each database element, and to program these synonyms into the system. Such a requirement makes the setup procedure of a natural language interface extremely cumbersome, and often impractical.

Another problem with providing a natural language interface for database retrieval stems from the fact that the end user does not know where desired information resides in the database. For example, some information would have to be retrieved from detail-level columns in the database, whereas other data would have to come from summary-level columns. The choice of which column(s) to use must be made by the system, since the end user is unable to specify the data location. This problem is referred to as the "data location problem".

The assignee of the present application has marketed a product in the past which attempted to resolve the data location and synonym problems. That product included a built-in database expert system containing rules to resolve a many-to-one relationship between words/phrases and concepts, and also to resolve one-to-many relationships between concepts represented in a natural language query and database columns. For example, words such as sales, sell, bought, purchases, and revenues contained in a query would be mapped to a concept known as "sales". Then, the concept "sales" would be mapped to the various columns of a specific database containing sales information. The specific product involved was a turnkey wholesale distribution application that provided a natural language interface to a specific database. The natural language interface was custom designed for the specific database, and was not database independent. The system did not provide means to enable a skilled user thereof to tailor the interface for any other database. The representation language provided by the natural language interface was not easily understandable to a skilled user. Thus, it will be appreciated that the prior system was not a general purpose database retrieval system.

It would be advantageous to provide a truly general purpose natural language interface for database retrieval, allowing skilled users (who are not experts in artificial intelligence computer theory and application) to easily custom tailor the interface to a specific application database. Such a system should solve both the data location problem and the synonym problem inherent in prior art natural language interfaces.

It would be further advantageous for such a system to generate a representation language, or "meaning representation" that is easily understandable, database independent, and canonical (i.e., two different queries having the same meaning must have the same final meaning representation, and two queries having different meanings must have different final meaning representations). Such a meaning representation should capture, at a conceptual level, the information requirement expressed in the natural language query.

It would be further advantageous to provide such a system in which a skilled user or "developer" builds a knowledge base, pertaining specifically to an application database, that enables the system to efficiently and economically retrieve and report data that is a proper response to a natural language query entered by an unskilled user. Such a system should interpret the query, use the knowledge captured in its database expert system to locate the relevant data tables and columns from a database, and then transparently generate the most efficient code (e.g., structured query language—"SQL") to produce a report instantly. No knowledge of SQL, database field names, or other technical jargon should be required of the end user.

The present invention provides such a database retrieval system and method for retrieving data from a database.

SUMMARY OF THE INVENTION

In accordance with the present invention, a database retrieval system having a natural language interface is provided. The system comprises a computer processor, and a natural language interface coupled to the computer processor. Tool kit means are also provided to enable a database developer to create a knowledge base containing a structural description and a semantic description of a database from which data is to be retrieved. First means operatively associated with the computer processor, produces a database-independent, canonical, internal meaning representation of a natural language query entered into the natural language interface. Second means, operatively associated with the computer processor, identifies database elements that are necessary to satisfy the query represented by the meaning representation. Third means, operatively associated with the computer processor, generates a database query among database elements identified by the second means, to enable the retrieval and aggregation of data from a database to satisfy the natural language query. Debugging means derive an easily understandable representation from the internal meaning representation. The external meaning representation enables the database developer to comprehend the internal meaning representation, and verify that a natural language query entered into the natural language interface is properly interpreted to effect the correct retrieval and aggregation of data from the database.

The meaning representation comprises entities and constraints relating to the entities, without reference to factual or linguistic relationships between entities that would prevent the meaning representation from being easily understood to a system developer.

The second means of the database retrieval system comprises an expert system coupled to access structural and semantic description information in the knowledge base, and identifies the database elements from the structural and semantic description information in accordance with predefined rules. The rules comprise steps for identifying an optimal set of database elements to satisfy the query represented by the meaning representation.

The structure of a database used in connection with the system of the present invention may be columnar, and the semantic description information can comprise a concept index of database columns. The semantic description can further comprise the time frame, value unit of measure, and aggregation level of database columns.

Means, operatively associated with the computer processor, can be provided for generating a formatted report containing data responsive to a natural language query. The debugging means can be used by a database developer to view the external meaning representation. A developer can also view a representation of the database elements identified by the second means. The debugging means can further enable the database developer to view the database query generated by the third means.

In order to identify an optimal set of database elements, the system can locate initial indexed columns, test subtypes, test data class-to-table rules, match characteristics and constraints, match time constraints, choose master table quantifiers, test for detail file columns, test for summary file preference, eliminate foreign-key-only tables, minimize tables, and then select the optimal navigation path through the database for satisfying a query. Data retrieved from a database in response to a natural language query can be displayed on a user's workstation, or printed for later reference.

In building the knowledge base, the database developer is able to enter join criteria, column semantics, data group definitions, and word and phrase associations into the knowledge base. The database developer can also build and modify the knowledge base by adding, deleting, and modifying subtypes; refining column references; adding, deleting, and modifying word-to-data class rules; adding, deleting, and modifying data class-to-table rules; and adding, deleting, and modifying nominal data definitions. Much other information can also be entered into the knowledge base and manipulated by the database developer.

DETAILED DESCRIPTION OF THE INVENTION

The present invention provides a database independent natural language interface for information retrieval. Unlike prior art systems, the present system can deal with large databases having complex semantics. For example, an item such as year-to-date dollars may be labelled in several tables of a complex database. The system of the present invention determines exactly where to get data in response to a specific request. The data may come, for example, from a table that contains summary-level or detail-level values. The system includes two key components; namely, a developer tool kit and a query system. The developer tool kit enables a system developer to build, test, and maintain a knowledge base containing information about an application database that the system will be used to query. The developer does not need to have any expertise in the computer science field of artificial intelligence, since the system produces external meaning representations that are easily understandable to the developer without such knowledge.

The query system allows users with little or no computer experience to enter a conversational English (or other natural language) query. A natural language interface interprets the query and reduces it into an internal meaning representation used by the system, and the external meaning representation that is easily understandable to the developer.

The system also includes a context expert system that fills in the implicit meanings of a query. Then, the data responsive to the query is located using a database expert system that enables retrieval of the data from proper tables and columns in the database. The database expert system is essentially an artificial intelligence engine that understands the database through the knowledge base set up by the developer, and through this understanding is able to find things in the database.

Figure 1:
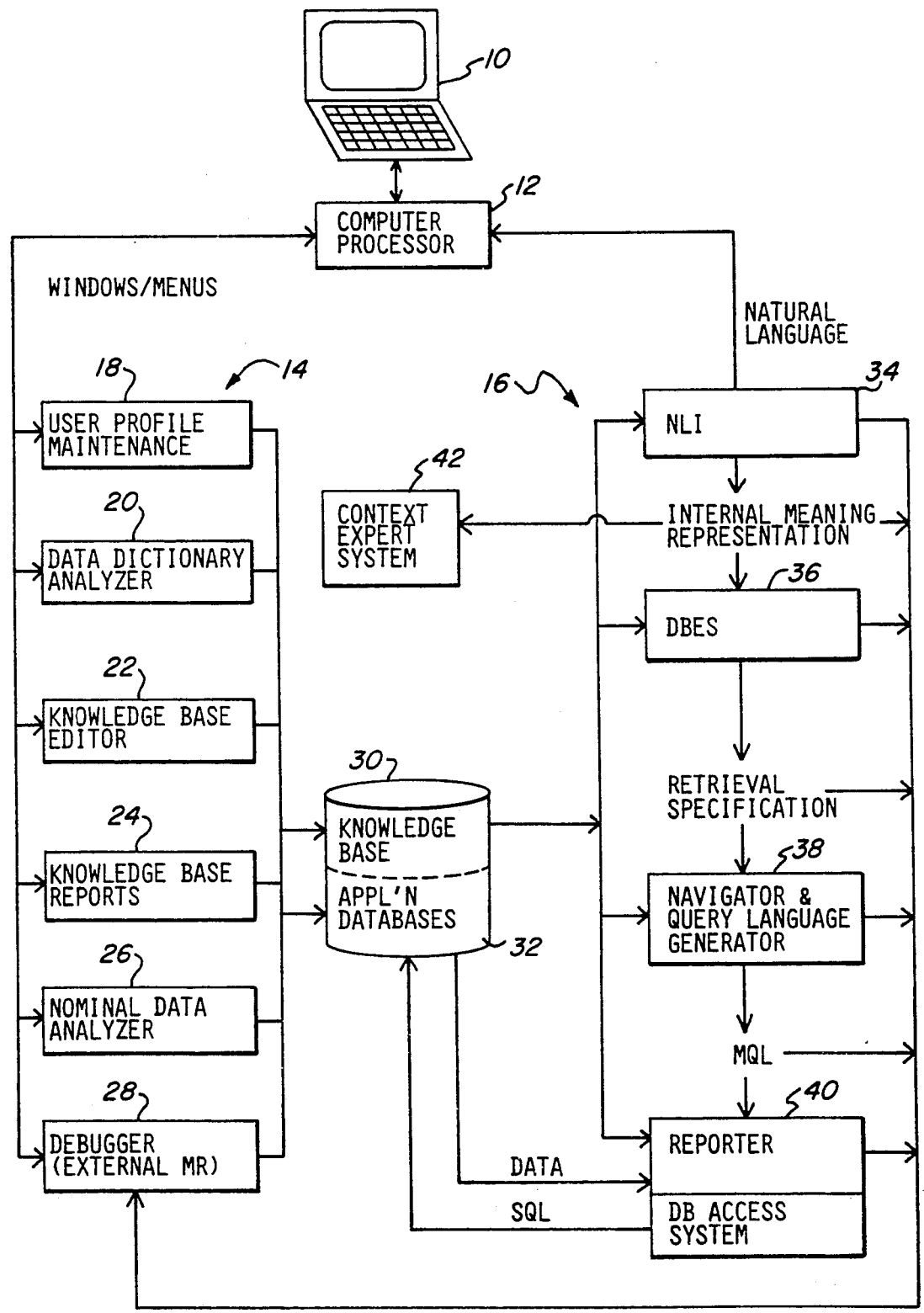
FIG. 1 is a block diagram of the system of the present invention.

Turning now to FIG. 1, the system of the present invention is depicted in block diagram form. A user, which can be either a developer (a high level user with some computer experience) or an end user (typically a manager or administrator with little or no computer experience) accesses the system through a workstation 10. Any number of workstations 10 can be provided to enable various system developers and end users to interact with the system.

A computer processor 12, coupled to workstation 10, controls the overall operation of the system. The elements generally designated 14 in FIG. 1 comprise the developer tool kit, which is used by system developers to communicate their knowledge of application databases to the system. It is important to recognize that the overall system of the present invention is database independent, and can be used with any application database once a developer builds a knowledge base containing information about the application database.

The elements generally designated 16 in FIG. 1 comprise the query system which is used to process a natural language query input by an end user, and to extract relevant information in response to the query.

A system developer accesses the developer tool kit 14 through a series of windows and menus displayed on workstation 10. In building a knowledge base, the system developer goes through a series of steps which are described in detail below in connection with FIGS. 4a and 4b. Generally, the steps taken by a developer include setting up a profile of the end user(s) as indicated at box 18 in FIG. 1, running a data dictionary analyzer 20, editing the knowledge base through editor 22, running and formatting reports through knowledge base reporter 24, running a nominal data analyzer 26, and debugging the knowledge base using debugger 28.

Data dictionary analyzer 20 automatically reads the relational database management system ("DBMS") catalog for the application database to learn all about the database structures such as tables, fields (i.e., "columns"), and data formats. Knowledge base editor 22 is used by the developer to give the system an understanding of the semantics, or meaning, of the data. For example, knowledge base editor 22 is used to provide the knowledge base with information as to how the DBMS tables are related to one another, and to define whether columns in the tables contain summary-level or detail-level data. Time and other attributes (i.e., information) for the columns is also entered through the knowledge base editor.

The knowledge base reports function 24 provides the developer with detailed information in printed form about the structural and conceptual data contained in the knowledge base. Nominal data analyzer 26 automatically reads nominal data values and sets up necessary definitions to enable queries to reference these data values by name. The term "nominal data" refers to columns in the application database that contain data whose values are names of things, such as products or customers.

The debugger 28 provided in accordance with the present invention is particularly powerful, due to the fact that it provides an external meaning representation for a query in an easy to understand form, and enables the developer, who typically has no knowledge of artificial intelligence principles, to follow the processing of the query by the query system at any point from the generation of the internal meaning representation, through the generation of the structured query language ("SQL") or other code that is ultimately produced by the query system to retrieve information from the database. The external meaning representation is provided to enable the developer to comprehend the interpretation of a query by the natural language interface.

Once a developer has entered the information necessary to build a knowledge base, the information is compiled to provide a run-time knowledge base 30 used by the query system to determine what data to access in response to a natural language query. One or more developers can build knowledge bases for different application databases 32 that can be accessed by the system.

The query system elements 16 depicted in FIG. 1 include a natural language interface 34, a database expert system ("DBES") 36, a navigator and query language generator 38, a reporter and database access system 40, and a context expert system 42. Natural language interface 34 comprises a natural language parser of a type known in the art, such as that available from Cognitive Systems, Inc. of New Haven, Conn., U.S.A.

The output of natural language interface 34 is used to produce an internal meaning representation that is used by the database expert system, but is not easily understandable. Thus, the internal meaning representation would be of little or no use to a developer.

Subsequently, and in accordance with the present invention, the internal meaning representation is transformed into an external meaning representation which is easily understandable to a developer. This process is depicted in the block diagram of FIG. 3. The external meaning representation enables the developer to debug and validate that portion of the knowledge base that is used by the natural language interface in connection with its query interpretation function.

Figure 3:
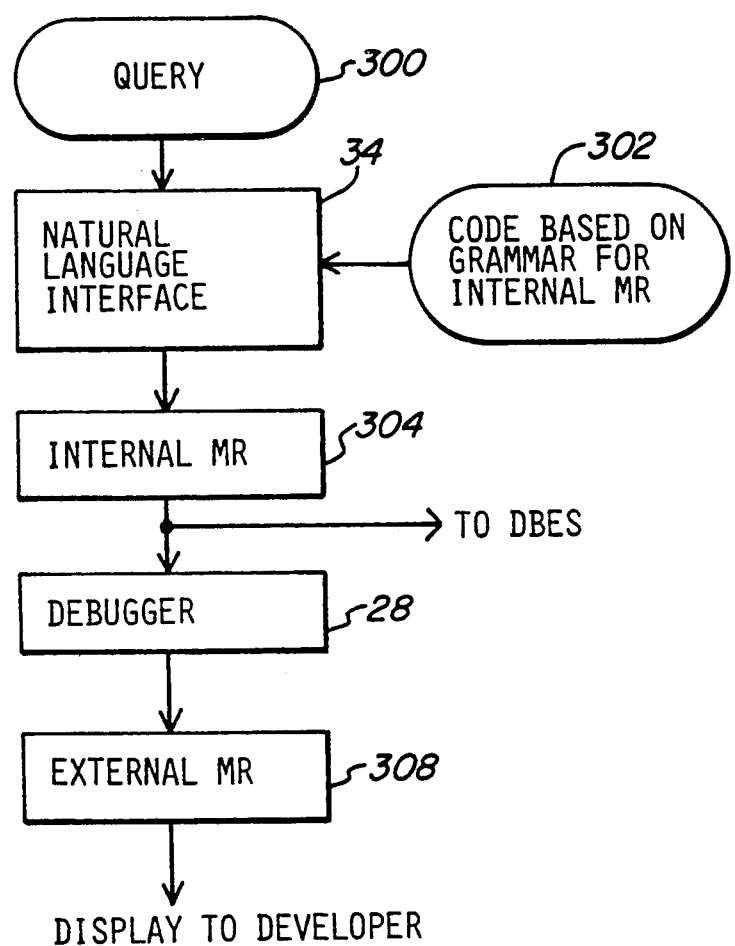
FIG. 3 is a flowchart depicting the translation of a natural language query to an internal meaning representation and an external meaning representation which is database independent, canonical, and easily understandable to a system developer.
Figure 7:
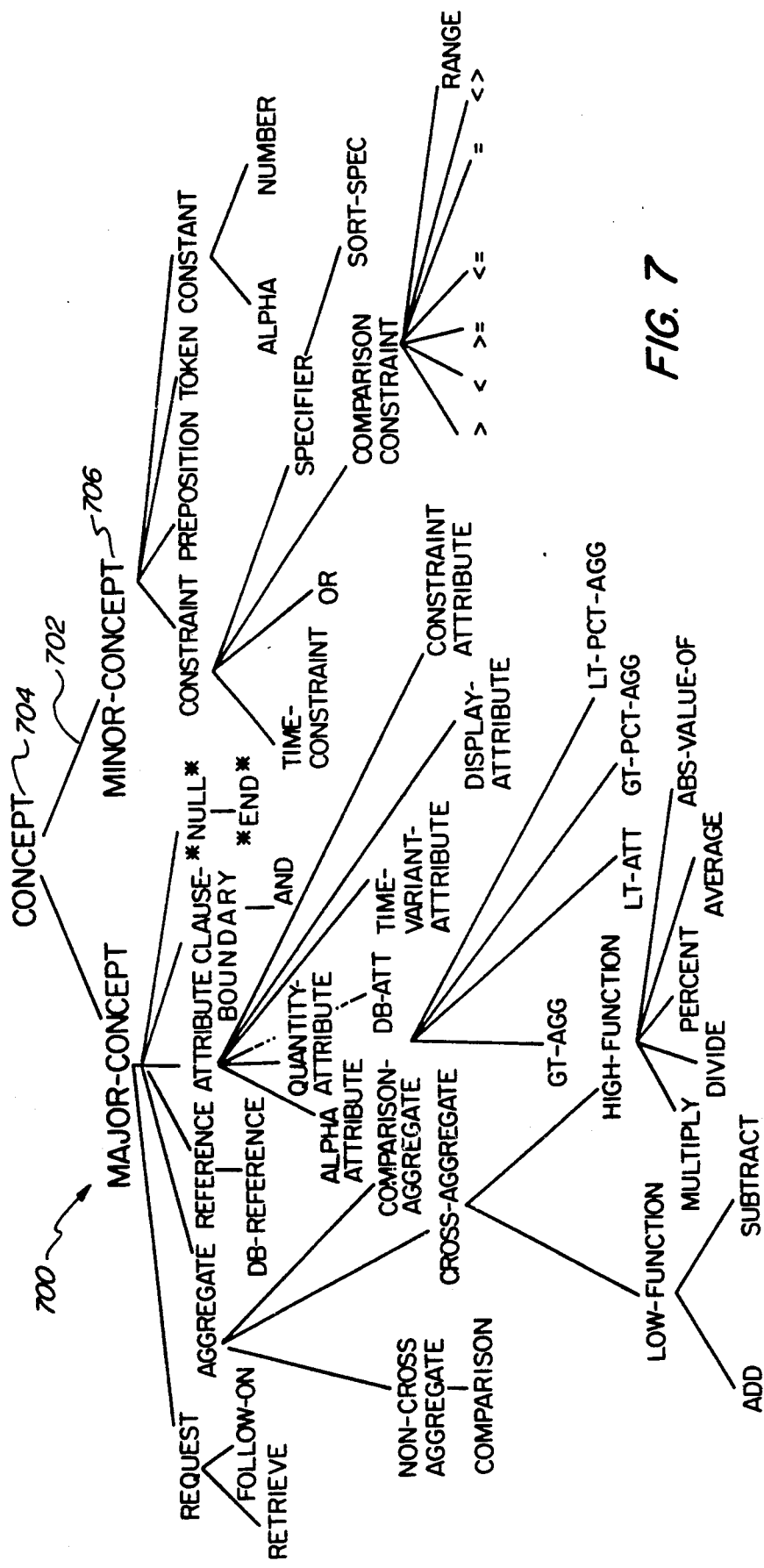
FIG. 7 is a semantic network diagram of the various concepts which can be included in an internal meaning representation.

As shown in FIG. 3, an end user inputs a natural language query 300 to natural language interface 34. Software ("code") 302 is provided for use by natural language interface 34 to enable the production of the internal meaning representation 304. Code 302 is based on the grammar for the internal meaning representation. The grammar for the internal meaning representation of a preferred embodiment of the present invention is set forth in Appendix A hereto. The notation of the grammar in Appendix A is in a standard form well known to those skilled in the art, and will enable a skilled programmer to generate code 302. A semantic network diagram 700 of various concepts that can be included in the internal meaning representation is provided in FIG. 7. Each line in the network diagram represents an "ISA" link. For example ISA link 702 specifies that minor-concept 706 is an attribute of concept 704.

The internal meaning representation 304 is converted, in accordance with the present invention, to an easily understood external meaning representation 308 by debugger 28 in the developer tool kit. The external meaning representation is database independent, canonical, and easily understandable. The feature of understandability enables a developer to comprehend how the natural language interface 34 has interpreted the query. With this comprehension, the developer can refine the knowledge base, as necessary, to ensure that the interpretation of a query by the natural language interface will be proper and that as a result, information retrieved by a query will properly reflect the intent of the end user.

Debugger 28 derives the external meaning representation from the internal meaning representation by finding all the entities in the internal meaning representation and placing them to the left of a colon. All of the constraints associated with the entities in the internal meaning representation are then located, and placed to the right of the colon, to form the external meaning representation. Thus, in a preferred embodiment the external meaning representation takes the form:

ENTITY: CONSTRAINT

In the external meaning representation, the hierarchy of the constraints in the internal meaning representation is ignored, as this information is not pertinent to the developer, and its inclusion would defeat the desired characteristic of easy understandability. Factual (i.e., "real world") and linguistic relationships between entities in the internal meaning representation, that would prevent the external meaning representation from being easily understood, are also ignored.

An example of an internal meaning representation, which would be produced by natural language interface 34 in response to the query "show total year-to-date sales dollars by customer", is as follows:

```
(Retrieve Reference (DB-REFERENCE
    Constrained-Slots
        ((SALES st ((YTD)
                    (DOLLAR)
                    (TOTAL)))
         (CUSTOMER st ((SORT Number (1))))))))
```

The same query will produce the following external meaning representation:

```
SALES:      YTD, DOLLAR, TOTAL
CUSTOMER:   SORT (1)
```

As will be appreciated, the internal meaning representation is not easily understandable, and would not enable a developer to comprehend how the natural language interface has interpreted a query. The external meaning representation, however, is quite clear, and will enable a developer to assess the accuracy of the natural language interface's query interpretation.

In accordance with the present invention, an external meaning representation can comprise several components; namely, display concepts, selection criteria, formatting directions, semantic modifiers, and time concepts. Examples of each of these, along with the vocabulary that produces them, are set forth in Appendix B hereto.

Turning again to FIG. 1, the internal meaning representation output from natural language interface 34 is an explicit meaning representation of the query. In the explicit meaning representation, ambiguities have been eliminated according to disambiguation rules, but inferences that fill in implicit meaning (e.g., ellipses) have not been made. Therefore, a context expert system 42 is provided to fill in ellipses and produce a final, implicit meaning representation that is then passed to database expert system 36. The context expert system 42 would be used, for example, for a query that concerns customers (e.g., "show customers") and then states "with address" without explicitly indicating that the address desired is that of each customer. The context expert system will refer back to the customer concept, and infer that the addresses desired are those of the customers.

By accessing semantic and structural information pertaining to an application database and residing in knowledge base 30, DBES 36 provides a retrieval specification that lists the tables and columns chosen, in accordance with column selection rules, for the retrieval of information from the application database in response to a query represented by the meaning representation. A navigator and query language generator 38 is used to define optimal navigation paths through the database tables and columns to respond to the query, and to generate a meta-query language ("MQL"). The meta-query language is used by a reporter and database access system 40 to generate the code (e.g., structured query language ("SQL") code) to actually retrieve the information from the application database. Reporter 40 also generates the reports which are displayed on the end user's workstation 10, or printed out for future reference.

Figure 2:
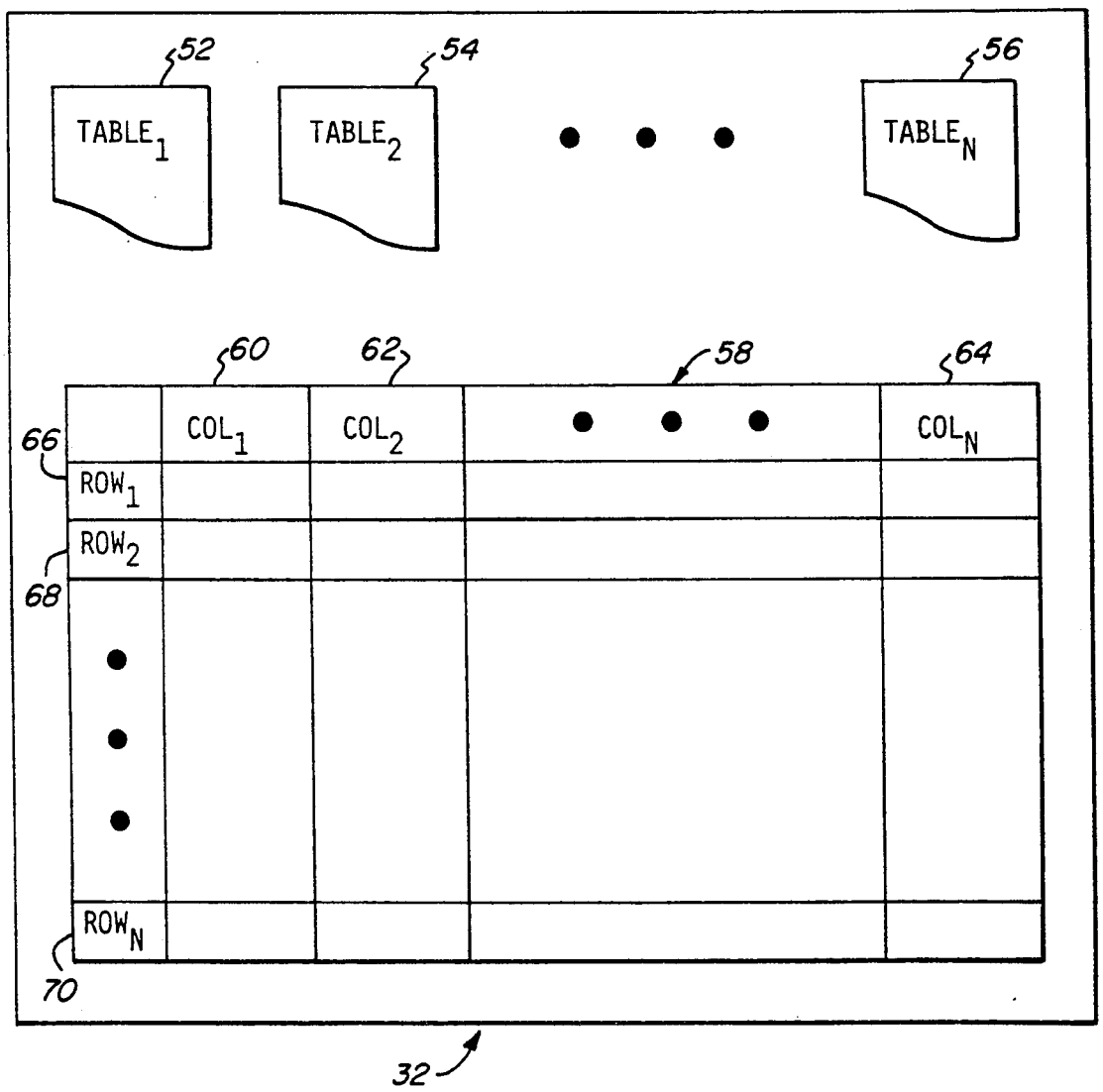
FIG. 2 is a diagrammatic illustration of a relational database.

FIG. 2 depicts the structure of a typical application database 32. Such a database includes various tables 52, 54, 56, each of which is a data structure holding data in the database. An example of such a table in greater detail is generally designated by reference numeral 58. As shown, table 58 includes a plurality of rows 66, 68, 70 and columns 60, 62, 64. In a typical sales database, a table designated "SALES" might contain columns for customer numbers, product numbers, year-to-date dollar sales, etc. Another table, designated "SALESMAN" might contain columns for salesman numbers, salesman names, and year-to-date dollar sales for each salesman. Similarly, there may be additional tables for "products", "customers", and more detailed information including "line items" and "orders". Each row in the table defines data for a different entity, such as different customers, different salesmen, different products, etc. By accessing a specific row and column, a particular piece of data can be retrieved.

Indexes can be provided in a relational database to provide quick access to rows in a table, and to enforce the uniqueness of rows within a table. Unique indexes enforce the requirement that rows not be duplicated within a table.

A "primary key" of a table is used to uniquely identify each row in the table and is comprised of one or more columns of a table. The value of a primary key uniquely identifies one row of a table. Therefore, for every primary key value there is exactly one row, and for every row there is exactly one primary key value. Relationships between entities are often represented through primary keys.

"Foreign keys" represent relationships between tables. Such keys consist of a column or group of columns whose values are derived from the primary key of a table, which can be another table or the same table in which the foreign key resides. The existence of a foreign key implies that the table with the foreign key is related to the primary key table from which the foreign key is derived.

Other characteristics of relational databases are well known to those skilled in the art.

In order to enable the system of the present invention to retrieve data from an application database, the database must first be defined by a developer, and the definition stored in the knowledge base. A knowledge base built by a developer is subdivided into related groups of tables, and each of these groups is also called a knowledge base. These knowledge bases include a structural knowledge base, a semantic knowledge base, a report knowledge base, a system knowledge base, and a utility knowledge base. The structural knowledge base contains structural role information about the application databases. Such information defines database nodes, databases, tables, columns, keys and domains, and indexes.

The semantic knowledge base contains dictionary information used by the language processing facility, and conceptual information about application databases. This knowledge base includes dictionary entries, concepts (i.e., "data classes", specifically "data groups" and "data categories"), calendars, column entries, structural element attributes (column "attributes" or "information", specifically report information, column descriptions, and characteristics including semantic data type, aggregation, and time specification), rules (including data class-to-table rules and word-to-data class rules) and nominal data information.

The report knowledge base contains information that facilitates report generation, such as saved requests for reports.

The system knowledge base includes security and configuration information, as well as logs of system operations. The utility knowledge base includes utility structures used by the system's internal knowledge base access system.

Various types of integrity rules apply to the knowledge base, including relation integrity rules that are referential integrity rules and special integrity rules. Referential integrity deals with the prevention of inconsistencies that may occur in the knowledge base because of foreign keys. Special integrity involves rules and procedures that must be observed to maintain consistencies between columns of the same or different tables when these consistencies cannot be expressed by referential integrity rules. Integrity rules that fall outside the category of relational integrity include domain integrity rules, rules specifying that the values in a set of columns are unique, and rules regarding the number of rows in a table.

Figure 4A:
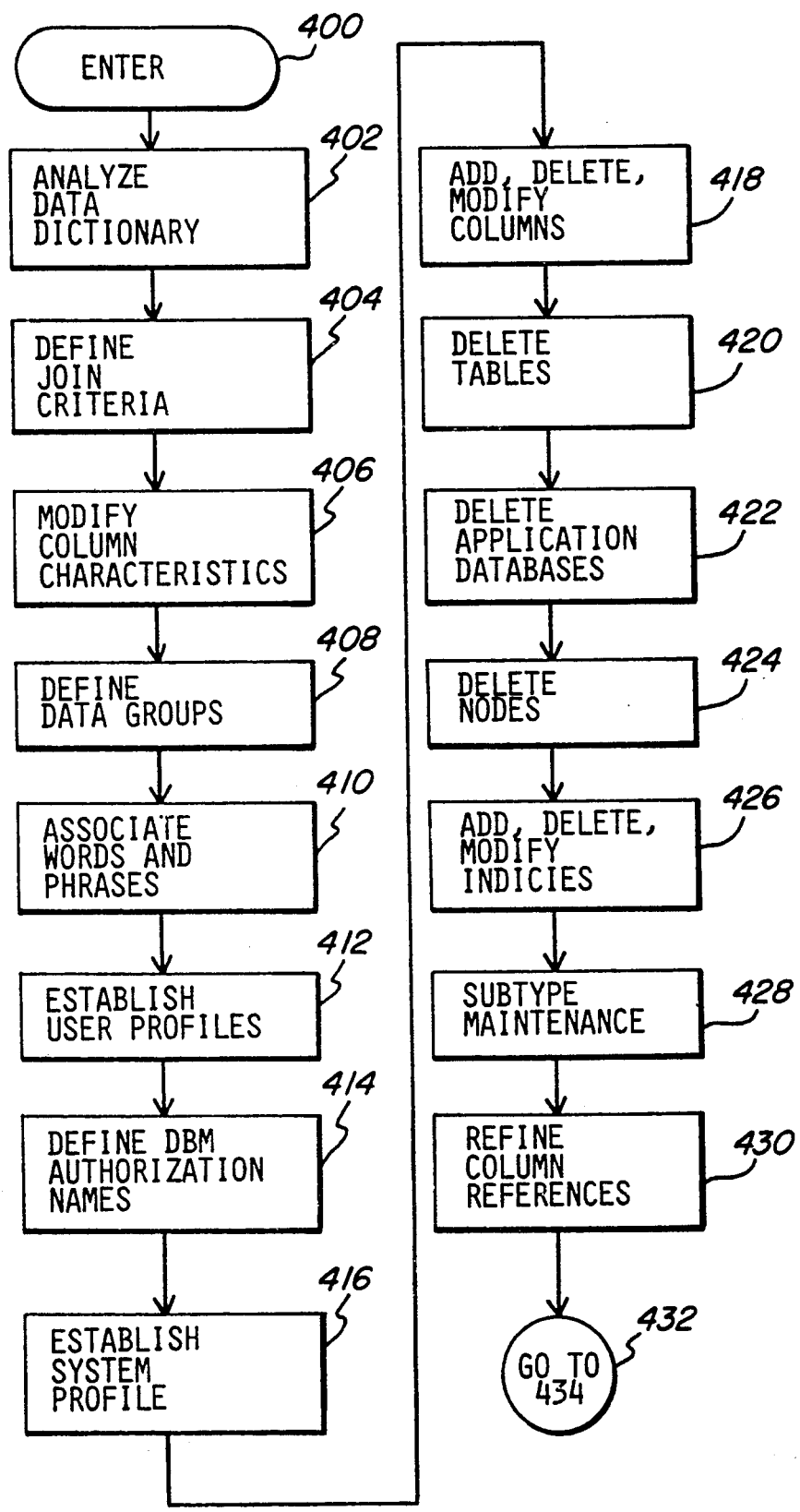
FIGS. 4a and 4b comprise a flowchart of the steps a system developer takes to create and maintain a knowledge base in accordance with the present invention.
Figure 4B:
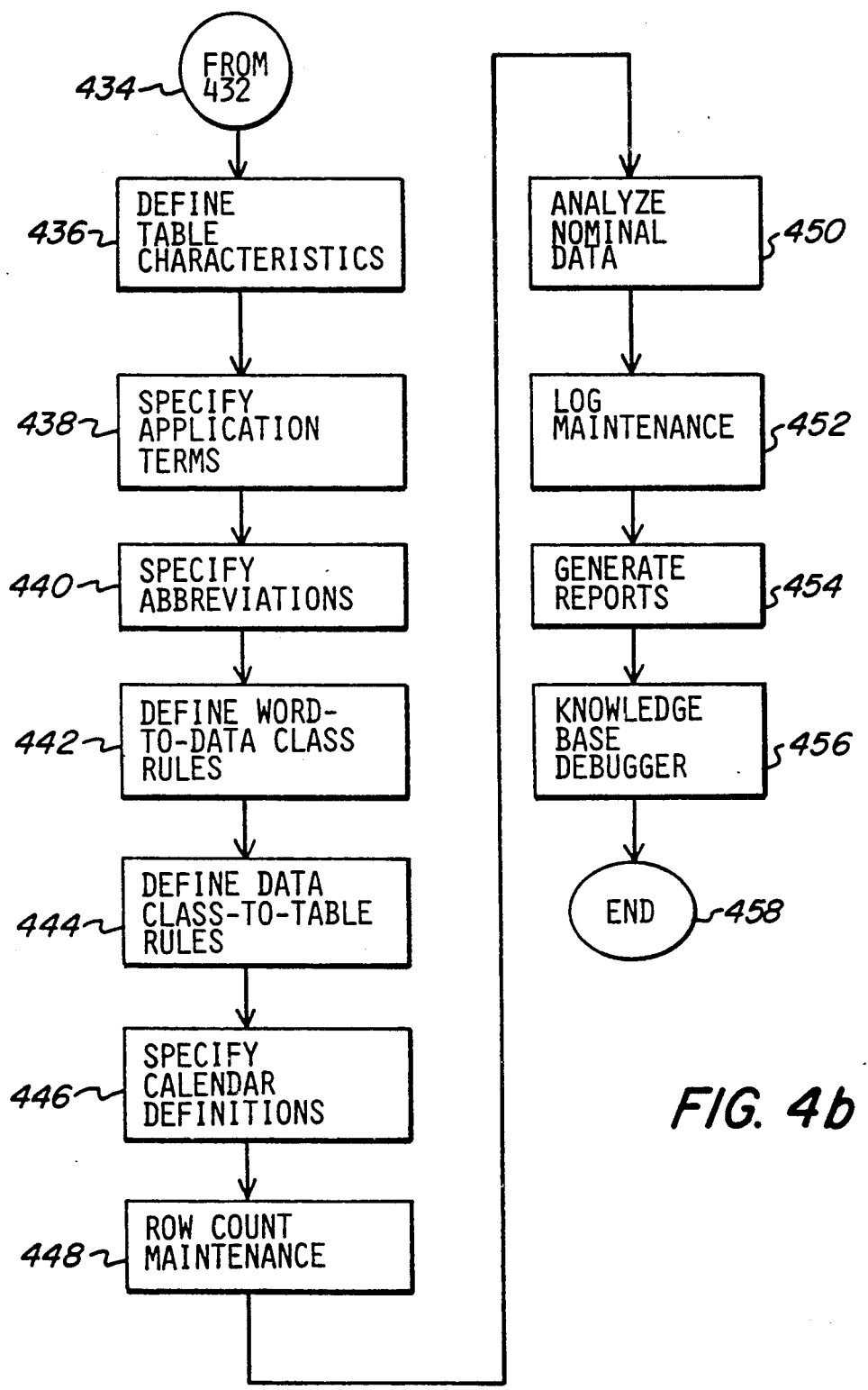

The steps taken by a developer in building a knowledge base using the developer tool kit are shown in the flowchart of FIGS. 4a and 4b. It is noted that although the developer tool kit is depicted in terms of a flowchart for purposes of explanation, the preferred embodiment provides the developer with access to the tool kit through the use of windows and menus. Therefore, the flowchart is not meant to imply that use of the tool kit is in any way dictated by the order of functions as they appear in the flowchart.

After entering the developer tool kit at box 400, a developer can run the data dictionary analyzer as indicated at box 402. The data dictionary analyzer analyzes the DBMS data dictionary to determine the structure of the data in the database by extracting table, column, and index information. After the system has completed this analysis, and stored the relevant database structural information, the developer is given an opportunity to define join criteria at box 404.

A join is the mechanism by which the relationship that exists between two or more tables is defined. A join is defined when a key in one table and a key in another table are given the same join name. As noted above, a key is a column or set of columns in a table by which the table is related to one or more other tables. The data contained in the key column(s) in one of the related tables is the same as the data contained in the key column(s) in each of the other related tables. One or more keys can be defined in any table, and can be composed of one or more columns.

To join two tables, the developer defines a primary key in one of the tables and one or more foreign keys in the other table, and specifies the same join name for each key. To join more than two tables, a primary key is defined in one of the tables, and one or more foreign keys are defined in each of the other tables. Then, the same join name is specified for each key. The primary key and all of the foreign keys that have the same join name belong to the same join. The relationship between each foreign key and its related primary key must also be defined by the developer. The relationship can be either one-to-one or one-to-many. If a foreign key can have the same value in two or more rows, the relationship is one-to-many. Otherwise, the relationship is one-to-one.

In defining join criteria, the developer can add a new join, delete a join, specify additional foreign keys, or remove existing foreign keys. After all the join criteria are specified, the developer is given the opportunity at box 406 to modify column characteristics.

The data dictionary analyzer (box 402) creates a column characteristics definition for each column that it analyzes. This definition becomes column reference entry number one for the column. The data dictionary analyzer also assigns the fully qualified column name to the column description field of the column characteristics definition. The column description becomes a direct column reference, such that if the column description is used in a query, the system retrieves data from that column for the report it displays in response to the query. A developer can delete from the knowledge base information about those columns that will never be selected when a query is being processed and will never be displayed on a report.

Column descriptions are used by the present system in two ways. First, if the word or phrase specified in the column description is used in a query, the column is considered for selection. Second, the column description specifies what is included in the query paraphrase if the column is selected. A query paraphrase is a reformulation of the query, which may be displayed to the system user, in order to verify that the system properly understands the query as originally input.

When a query is submitted, it is analyzed and reduced to an internal meaning representation and an external meaning representation. In the first step of the column selection process, each column that is referenced by an entity in the external meaning representation is identified. In this way, one or more columns can be identified as candidates for selection. In the second step of the column selection process, the constraints present in the query are used by matching them with the column characteristics defined by a developer, in order to eliminate some of the columns that have been identified. This refinement or optimization process utilizes semantic data type, aggregation, and time information input to the knowledge base by the developer. The columns that are not eliminated are then selected to compose the report that the system ultimately produces in response to a query. At step 406, the developer is permitted to modify the column characteristics definition, but may not delete it.

After the modification of column characteristics, the developer can define data groups as indicated at box 408. In simple applications, column descriptions specified in column characteristics definitions can be used to find the column or columns that contain the data that must be retrieved in response to a query. For complex applications, further definition is required to enable the system to locate the data. This is accomplished by grouping the columns of an application into data groups. After data groups have been defined, words and phrases can be associated with the data groups, as indicated at box 410. When an end user includes one of the associated words or phrases in a query, the system considers the columns in the data group for selection. A developer can add or delete data groups, and add or delete one or more columns to a previously defined data group. The developer can associate words or phrases with data groups and data categories.

At box 412, the developer establishes user profiles for each end user. Such profiles are used when an end user logs into the system to determine which values have been assigned to certain parameters and whether certain operations are authorized for the user.

At box 414, the developer defines database manager ("DBM") authorization names to make it possible for a user for whom a user profile is added to access the proper tables in the application database.

At box 416, the developer can establish the system profile to specify information such as the type of automatic logging that is to take place and the type of information that is to be logged, whether error logging and/or query trapping is to be enabled, and to define certain defaults such as time type, current fiscal year, and current period. The concept of query trapping is discussed below in connection with box 448 of FIG. 4*b*.

At box 418, the developer can add, delete, and modify columns without re-running the data dictionary analyzer. Similarly, tables may be deleted at box 420 without re-running the data dictionary analyzer. Deleting a table from the knowledge base automatically deletes all keys, indexes, table characteristics definitions, columns, column characteristics definitions, and column reference definitions that are associated with the table.

At box 422, application databases may be deleted without running the data dictionary analyzer. At box 424, nodes can be deleted from the knowledge base without running the data dictionary analyzer. Deleting a node automatically deletes all of the databases, tables, keys, indexes, table characteristics definitions, columns, column characteristics definitions, and column reference definitions associated with the node.

At box 426, the developer can add, delete, and modify indices without running the data dictionary analyzer.

Subtype maintenance is provided at box 428. A subtype (sometimes referred to as a "restriction concept" or "modifier") limits or qualifies the meaning of a data group or data category. Subtypes are used in column reference definitions and the data class-to-table rules to control the column selection process. Before a subtype can be used in a column reference or a data class-to-table rule, it must be defined. A subtype definition contains an arbitrary name for the subtype and the words or phrases that are associated with it.

At box 430, the developer is provided with an opportunity to refine column references. Column references (or "column-choice entries") give the system additional information it needs to determine which columns of data to retrieve in response to a query. A column reference provides a developer with a means of refining the column selection criteria. For example, a developer could specify that one column is to be preferred if the end user uses words or phrases that refer to the subtype "open", and another column is to be preferred if the end user uses words or phrases that refer to the subtype "closed".

In analyzing a query, the system of the present invention separates the query into three components; namely, data classes (data groups and data categories), column descriptions, and direct column references, each of which appear as entities in the external meaning representation. Identification of the three components listed is accomplished by analyzing the words and phrases in the query. A data group or data category is identified if either a term that has been associated with the data group or data category is used in the query, or a word or phrase that is used to define an application term is used in the query. A column description is identified if either the column description specified in a column characteristics definition is present in the query, or an application term that refers to the column description is used in the query. A direct column reference is identified by a column description, or a word or phrase (not a data class) that has been specified in the reference field of a column reference. In accordance with the present invention, the data groups, data categories, column descriptions, and direct column references can be viewed by the developer by requesting a final conceptual query representation when in the debug mode of the developer tool kit.

When column descriptions are found in a query, no additional information is necessary for the system to determine which columns to select. However, for data classes, additional information is required, and is entered at box 430 through the column reference refinement procedure. It will be apparent that a data group or data category refers to a column if either the column can be referred to by combining a word that is associated with the data group or data category with a data specification, a unit of measure, a level of computation, or a time-related value; or, the column is one in a set of columns that should be retrieved in response to a query such as "show customers" (in which "customers" is a data group or data category). Multiple column references can be defined for a column, and each reference provides a different means by which the column can be selected. For example, a column can be selected by a column description, direct column reference, data group, or data category. Thus, at step 430, a developer can add, modify, or delete a reference to a column by a data group; add, modify, or delete a reference to a column by a data category; and add, modify, or delete a reference to a column by a word or phrase.

After refining column references, the flowchart proceeds to box 436 of FIG. 4b via boxes 432 and 434. At box 436, a developer defines table characteristics for each of the tables contained in the application database. Table characteristics definitions are used to specify the columns in the table that are always displayed in reports, whenever any column in the table is chosen by the system during the processing of a query submitted by an end user. Table characteristics definitions also specify calendar information and time information. Table characteristics definitions can be added, modified, and deleted by the developer.

At box 438, the developer specifies application terms which are words or phrases that are defined in terms of a word or phrase already existing in the application dictionary. When an application term is used alone, it is exactly equivalent to the word or phrase that defines it. However, if an application term is used as part of a phrase (or, if the term is a phrase, as part of a larger phrase), it is not necessarily equivalent to the word or phrase that defines it. For example, if a developer adds the term CUST and gives it the definition CUSTOMER, then the term CUST can be substituted for the word CUSTOMER in a query and the result will be the same. However, if the term BEST CUSTOMER has also been defined, the phrase BEST CUST may not be substituted for the term BEST CUSTOMER with the same result. To define two terms that have the same definition, the same full definition can be specified for both terms, or the full definition may be specified for one term and then that term may be specified as the definition of the other term.

Abbreviations are specified by the developer at box 440. An abbreviation is a word or phrase that is equivalent to another word or phrase. The equivalence exists whether the abbreviation is used alone or as part of a phrase. Thus, in the example above, if CUST is defined as an abbreviation for CUSTOMER, then BEST CUST can be substituted for BEST CUSTOMER with the same result.

At box 442, the developer may define word-to-data class rules (sometimes referred to as "word-to-concept rules"). These rules are used by the system when a word or phrase that has been used in a query points to two or more data classes. Only one word-to-data class rule can be defined for any word or phrase.

An example of an instance where a word-to-data class rule would be necessary is where end users may formulate several different queries that include the word "owe". Some may be concerned about how much money their company owes one of its vendors, others may be concerned about how much money their customers owe. Examples of such queries might include the following:

1. Does anyone owe us money?
2. Who do we owe money?
3. What is owed?

In the first query, which is concerned with money owed by customers, the word "owe" is followed by the word "us". In the second query, which is concerned with money owed to vendors, the word "owe" is preceded by the word "we". In the third query, it is not clear whether the word "owed" relates to "owing" or to "being owed".

In this situation, the developer will create a word-to-data class rule for the word "owe" that takes into account all of the above possible queries. The following rule is an example:

```
IF WORD-FOLLOWS (ME, US)
    THEN CUST_BALANCE
ELSE IF WORD-PRECEDES (I, WE)
    THEN VEND_BALANCE
ELSE QUERY-USER ("OWED BY CUSTOMERS",
    "OWED TO VENDORS", CUST_BALANCE,
    VEND_BALANCE)
```

Using this rule, the system uses the data class CUST_BALANCE for the first query and uses the data class VEND_BALANCE for the second query. For the third query, the user is asked to specify either "owed by customers" or "owed to vendors". If the user specifies "owed by customers", the data class CUST_BALANCE is used. If the user specifies "owed to vendors", the data class VEND_BALANCE is used.

In addition to defining word-to-data class rules as described above, a developer can also define data class-to-table rules (sometimes referred to as "concept-to-table rules") as indicated at box 444 of FIG. 4b. A data class-to-table rule is necessary when a data class refers to columns in more than one table. Such a situation is created by specifying the same data class when column references for columns are defined in two different tables. However, it is not necessary to define a data class-to-table rule if the two tables have been joined. Only one data class-to-table rule can be defined for any data class.

For example, if a data class SALES has been defined that points to both the CUSTOMER table (for month-to-date sales) and the SALES_HIST table (for year-to-date sales), the system needs a data class-to-table rule to be able to handle a query such as: "show sales". In this case, the developer must decide whether the user is more likely to want month-to-date or year-to-date information in response to such a query. If the most likely situation (the default) requires year-to-date information, the following data class-to-table rule permits the query to be handled:

```
DATA CLASS=SALES;
IF WORD-PRESENT (MTD)
    THEN CUSTOMER
ELSE SALES_HIST;
```

At box 446, the developer may specify calendar definitions. Generally, the time related data in an application database relates to a normal annual calendar with quarters that start on January 1, April 1, July 1, and October 1. If a fiscal calendar is desired, or a calendar with a number of periods peculiar to a particular application is necessary, the appropriate information is specified by the developer.

At box 448, a scheme referred to as "row count maintenance" can be implemented. Some of the tables in an application database may contain a very large number of rows. A query submitted by an end user may cause a column or columns from such a table to be selected. Extracting data from such a column or columns to prepare a report in response to the query may tie up the system for quite some time, and be expensive. Thus, the developer can enable expensive query trapping. In this mode, the system estimates the number of rows that must be processed to answer each query and saved request. To do this, it must know approximately how many rows are contained in each table. A developer can specify the approximate number of rows in each table by using the row count maintenance feature. Generally, this feature should be used before expensive query trapping is enabled and whenever the number of rows in one of the tables changes significantly.

At box 450, the system can be instructed to analyze nominal data, i.e., columns in the application database that contain data whose values are names of things, such as products or customers. The nominal data analyzer automatically reads nominal data values and sets up the necessary definitions so that queries can reference these data values by name. Once the nominal data analyzer has been run, any one of the words used in a description composed of several words will, if used in a query, cause information about the nominal data to be displayed.

At box 452, a query log and error log provided by the system can be maintained by a developer. At box 454, the developer can generate knowledge base reports. Such reports are useful to provide the developer with detailed information in printed form about the structural and conceptual data contained in the knowledge base.

At box 456, the developer can enter the debugger provided in the present system. Although part of the developer tool kit, the debugger is entered when the developer is using the query processor. As noted above, this feature enables the developer to view the processing of a query throughout each stage of the query processor. The debugger converts the internal meaning representation used by the query processor to an easily understandable meaning representation that enables the developer to comprehend the processing of a query. When in the debugging mode of operation, the developer can input test queries to the query processor, explore their interpretation by the query processor (via the external meaning representation, the MQL, and the SQL), and analyze the data reports generated by the system to determine if natural language queries retrieve the correct information.

The developer tool kit routine ends at box 458.

When a developer has completed the task of building a knowledge base, or has completed modifications to an existing knowledge base, the information is compiled. During the compilation, navigation paths and join column domains are generated. At the same time, the application dictionary, structural information, and indexed rules are checked for validity. After compilation, the developer can test the new knowledge base and if unsuccessful, modifications can be made by again entering the developer tool kit, and repeating the process until a satisfactory knowledge base has been completed.

Figure 5:
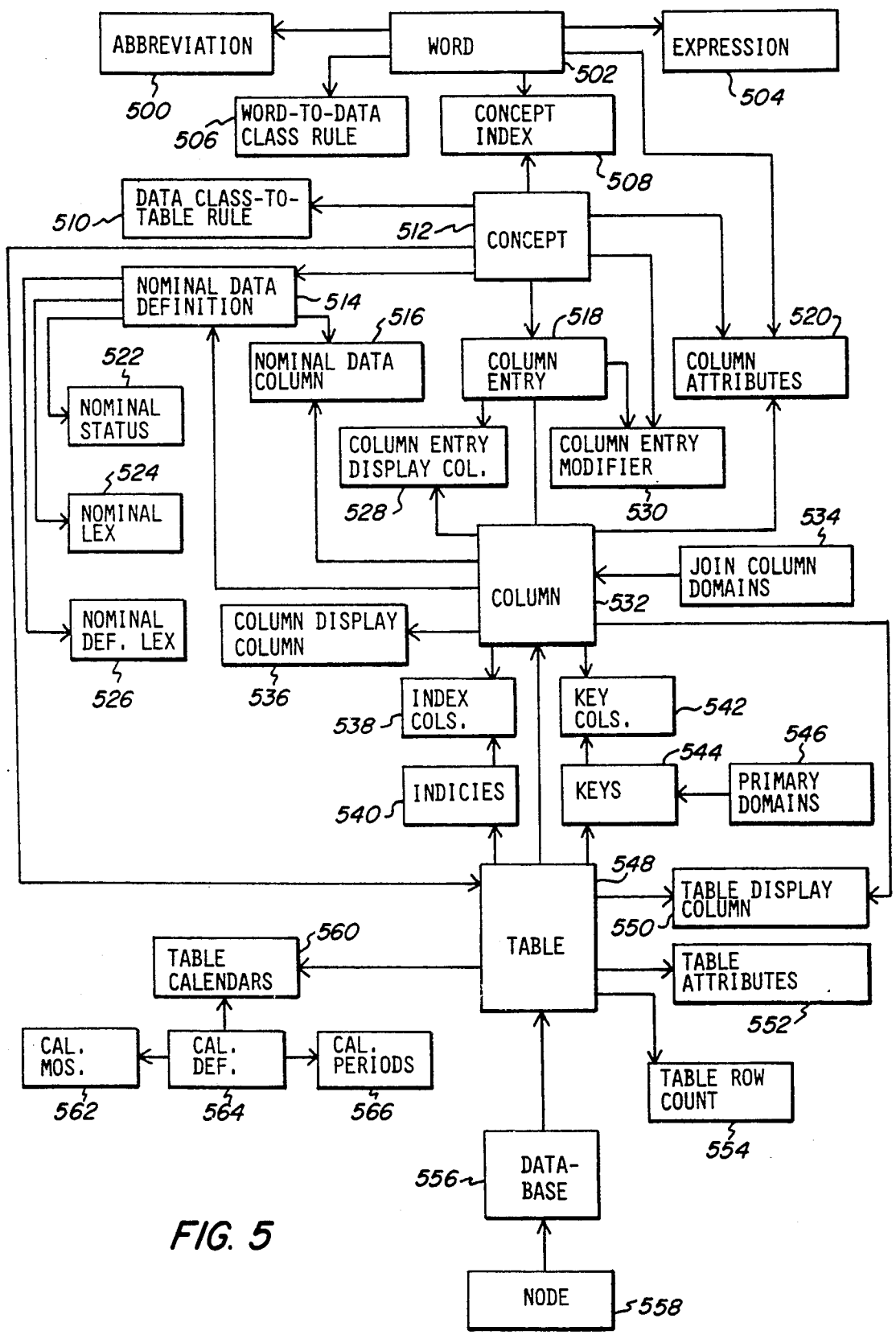
FIG. 5 is an entity-relationship diagram for a knowledge base created in accordance with the present invention.
Figure 6A:
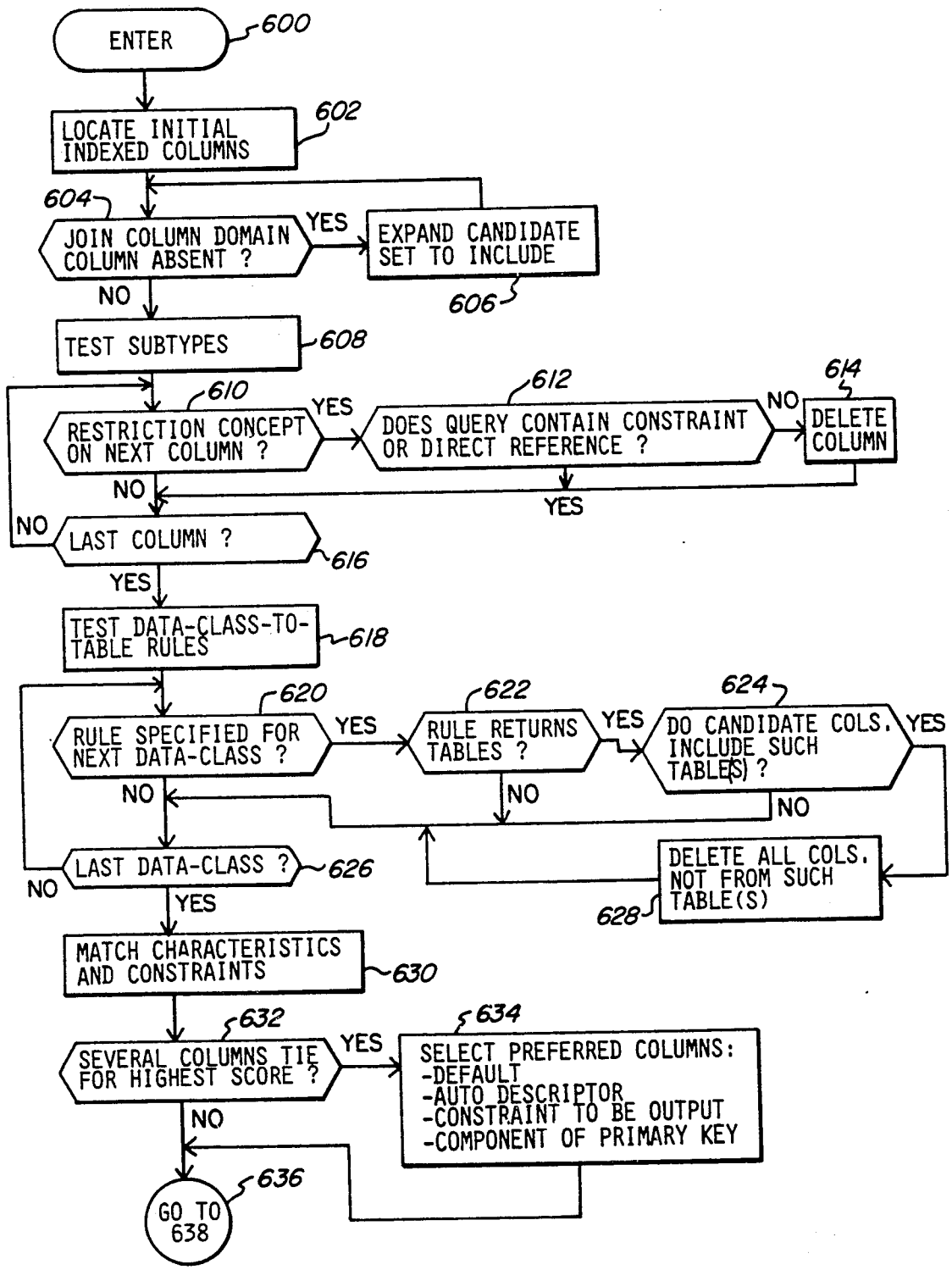
FIGS. 6a, 6b, 6c, and 6d comprise a flowchart of the column selection process used by the system of the present invention to identify an optimal set of database elements necessary to satisfy a query.
Figure 6B:
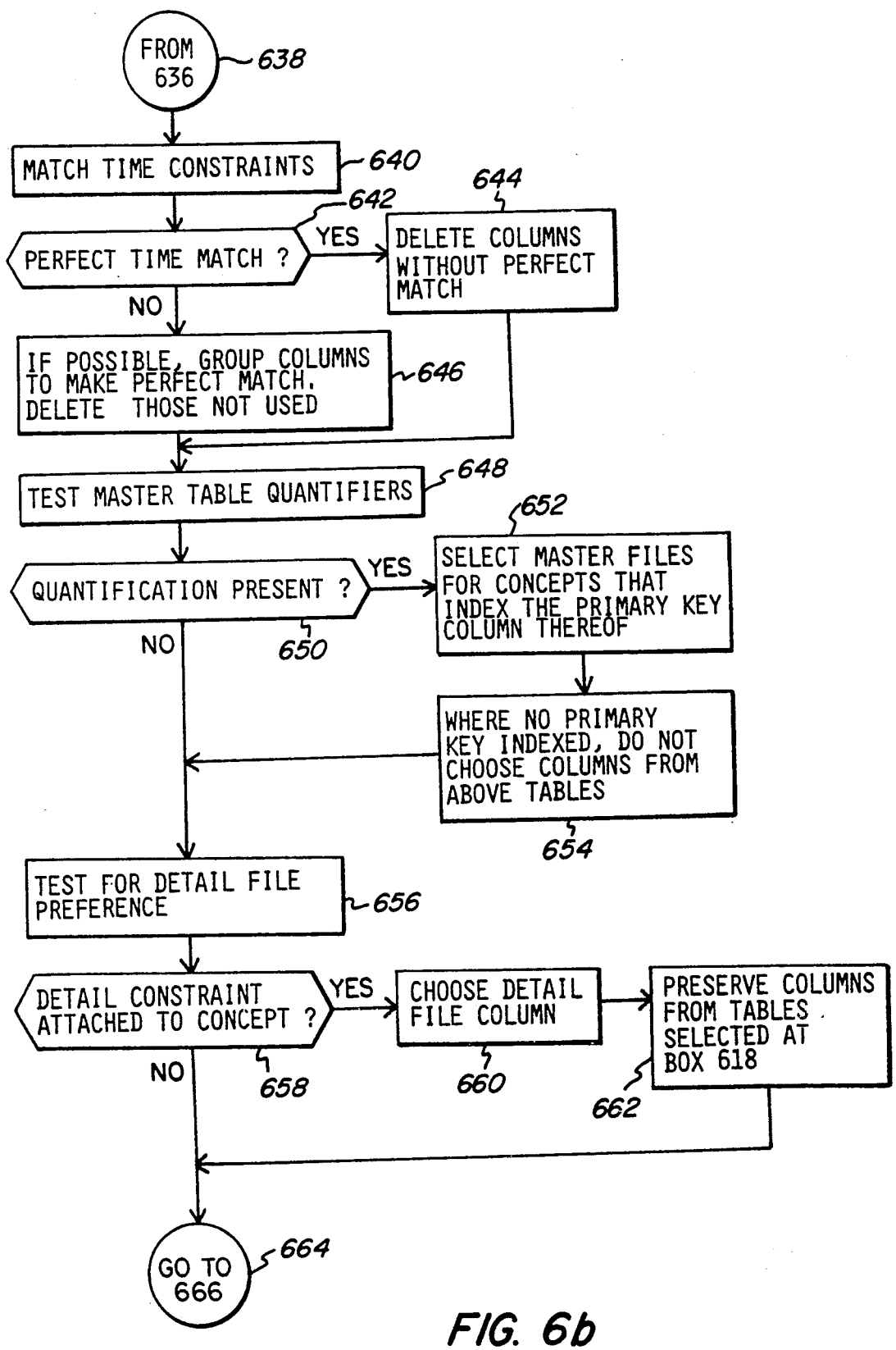
Figure 6C:
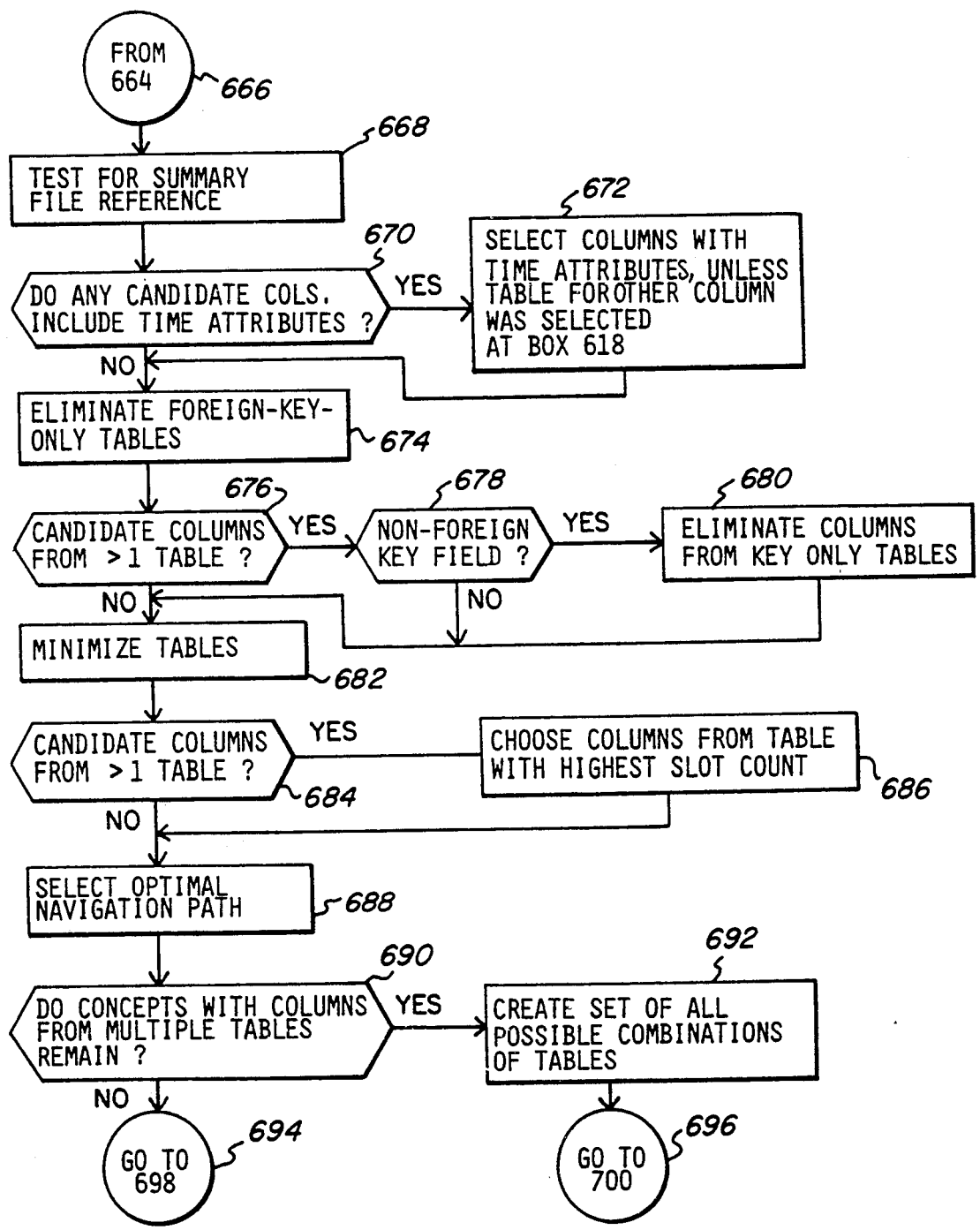
Figure 6D:
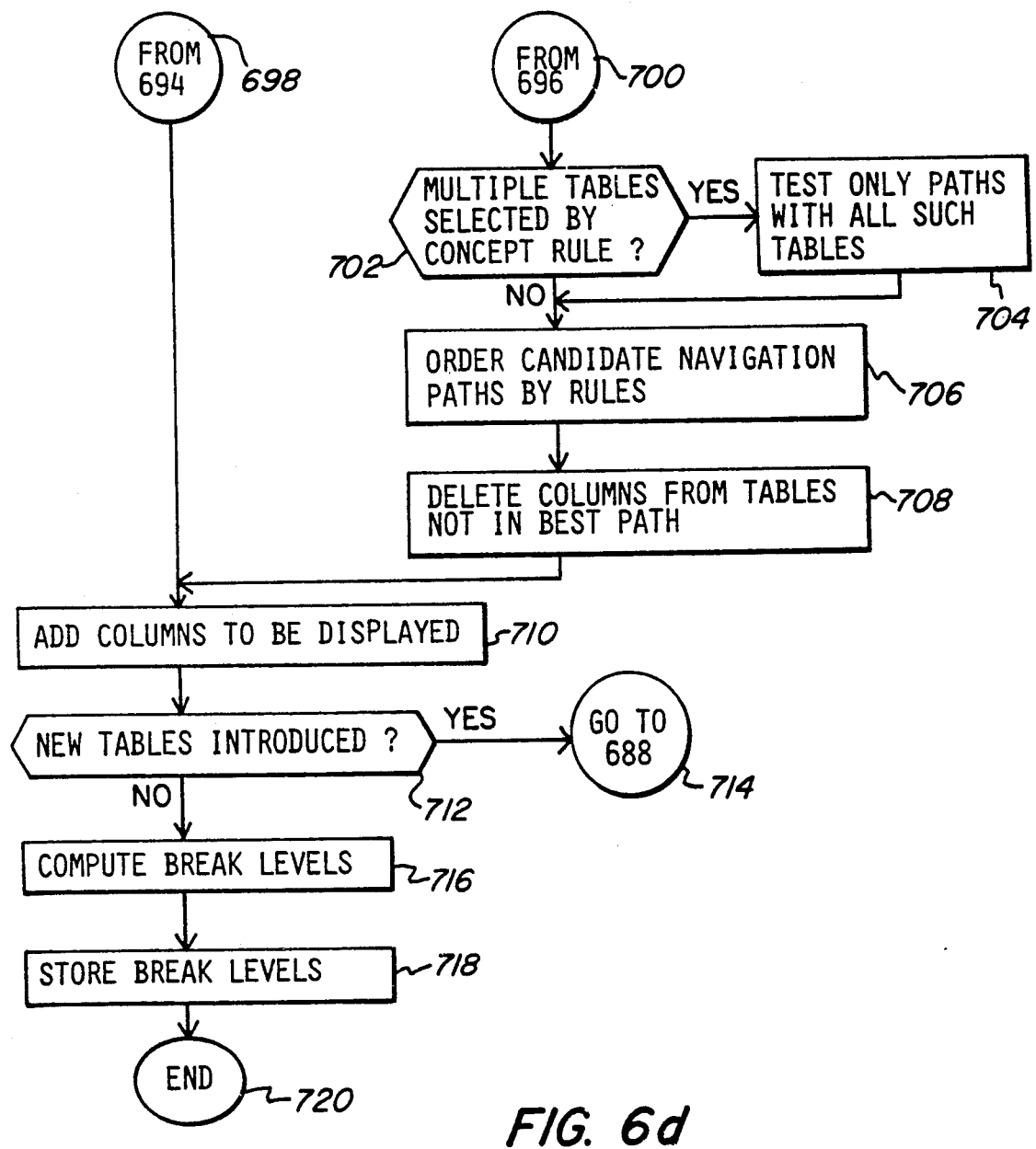

FIG. 5 is an entity relationship diagram for a knowledge base constructed in accordance with the present invention. This diagram illustrates the mappings of words, concepts, columns, and tables within the database and the relationships between these entities and the attributes and rules defined by a developer. For example, word 502 maps onto abbreviation 500, expression 504, concept index 508 (which maps to concept 512), word-to-data class rule 506, and column attributes 520. Concept 512 maps to data class-to-table rule 510, table 548, nominal data definition 514, column entry attribute 518, and column attributes 520. The mappings of each of the other entities and other attributes is apparent from FIG. 5.

As noted in connection with FIG. 1, after the knowledge base 30 has been built for an application database 32, the query processor 16, and particularly database expert system 36, uses the information stored in the knowledge base to locate data from the application database 32 that is responsive to a query. In a preferred embodiment of the present invention, an initial set of candidate columns from the database is identified by the database expert system, and that candidate set is then narrowed down to identify an optimal set of database elements to satisfy the query. The column selection and optimization routine is shown in the flowchart of FIGS. 6a to 6d. The routine is entered at box 600, at which point every attribute referenced in the final meaning representation for the query is gathered and built into a table of the columns that should be used to resolve each attribute. Then, a sequential execution of the heuristic rules designated at boxes 602, 608, 618, 630, 640, 648, 656, 668, 674, 682, 688, 710, and 716 proceeds.

At box 602, an initial candidate set of columns is located. This candidate set has one entry for each basic concept (i.e., data group or data category) or direct column reference inside a query concept. Each entry is composed of the data group or data category, plus all column entries indexed by that concept or direct column reference. For every join column domain column in the candidate set, the candidate set is expanded to include any equivalent join column domain columns that may not have a column entry. This procedure is indicated at boxes 604 and 606. A "join column domain column" is a set of semantically equivalent columns derived from primary and foreign key information about an application database.

After the expansion of the initial candidate set is complete, control passes to box 608 where subtypes are tested. The testing procedure can proceed on a column by column basis throughout the initial candidate set, and as indicated at box 610, a determination is made for each column as to whether a restriction concept is specified. If so, control passes to box 612 where a determination is made as to whether the query contains a constraint on the concept or a direct reference to the column. If not, the column is deleted at box 614. Otherwise, control flows directly to box 616 where a determination is made as to whether the last column in the candidate set has been tested. If not, a loop continues until all columns have been tested. Thus, the rule for testing subtypes eliminates any columns from the candidate set for which (i) a restriction concept is specified for the column, and (ii) the restriction concept is not present as a constraint on the concept or a direct column reference in the concepts identified from the query.

The next rule applied tests data class-to-table rules, as indicated at box 618. These are database specific rules entered by the developer when the knowledge base is built, and they take priority over everything except the subtype rules dealt with at box 608. It is noted that the subtype rules are also defined by the developer in creating the knowledge base. At box 620, a determination is made as to whether a rule has been specified for the next data class present in the query. If so, the rule will return either a list of tables or a NIL. The list of tables are the preferred tables for the data class. If the candidate columns for the data class include one or more of these tables, all columns not from any of the tables are deleted. If a NIL is returned, it means that the rule does not apply to the current query and its result should not effect the candidate set. A concept without a data class-to-table rule is treated as if its rule returned a NIL. Accordingly, if at box 620 a determination is made that a rule has been specified for the next data class tested, and the rule returns tables at box 622, then control flows to box 624 to determine whether the candidate columns include such tables. If so, all columns not from those tables are deleted at box 628. Box 626 determines if the last data class in the query has been tested, and if not, a loop continues until the testing is complete.

At box 630, characteristics and constraints are matched. The best candidate column(s) is selected for each data class in the candidate set according to the following procedure:

1. Each candidate column is scored by counting one point for each semantic descriptor of the column that matches one of the constraints or specifiers in the query concepts attached to the data class.
2. Then, the column with the highest score (or the set of columns that tie for the highest score) is found. If the concept has no specifiers or constraints, all indexed columns tie with the score of zero.
3. If there are more than one highest score columns, then, within a table, any that have been marked as default columns by the developer are preferred.
4. If any of the candidates have an AUTO descriptor, or a constraint to be output, or are a component of the primary key, then they are selected also.

This procedure is used to find the best semantic matches between a query and candidate columns. For example, if the query asks for year-to-date information, and such information is available directly from a column, then corresponding month-to-date columns for the information are eliminated.

Box 632 designates the determination as to whether several columns tie for the highest score. If so, then the preferred columns are selected at box 634. As noted above, preferred columns include those marked default, those with an AUTO descriptor, those with a constraint to be output, and those which are a component of the primary key. From box 632, control passes to box 640 via boxes 636 and 638. At box 640 columns are selected on the basis of the best time match. A perfect time match is preferred. Thus, for example, if year-to-date information is requested, and available directly from a column in the candidate set (e.g., YTD-SALES), this column is preferred to a partial match such as month-to-date sales. This determination is made at box 642. If a perfect match is found, columns without a perfect match are deleted at box 644.

If no perfect time match is found at box 642, then at box 646 columns are grouped, if possible, to make a perfect match. Those not used are deleted.

At box 648, master table quantifiers are tested. If quantification is present in the query, as determined at box 650, then two preferences are necessary. First, at box 652, master files are selected for concepts that index the primary key column of the master file. For concepts within the chain of quantification, or that are constrained but do not index the primary key column of a master file, it is preferred not to choose columns from the tables chosen at box 652. This is indicated at box 654.

The selection of master table quantifiers depicted at boxes 648 to 654 can be better understood by reference to several examples. If the query is "What customers have no sales this month?", then a master file for CUSTOMER (e.g., CUST.CUST#) is preferred and a table other than CUST is preferred for SALES.

If the query is "show salesmen all of whose sales were in Connecticut", then a master file for SALESMEN (e.g., SALESMEN.SLM#) is preferred, and a table other than SALESMEN is preferred for SALES and for STATE. Note that choosing STATE from the SALESMEN table would be an error (sales of all Connecticut salesmen) that would be difficult for a user to detect.

In another example, the query might be "what customers have bought every product this month?". A master file for CUSTOMER and for PRODUCT would be preferred, and a table other than either CUST or PROD would be preferred for SALES.

After the master table quantifiers are tested, the system tests for detail file preference at box 656. For each concept, detail file columns (i.e., a column from a table that has at least one column with a DATE data type or a data value meaning of DAY, WEEK, MONTH, QUARTER, PERIOD, or YEAR) are preferred if any detail constraint such as COUNT, AVERAGE, TOTAL, MINIMUM, MAXIMUM or EACH is attached to the data class in the query concepts. A determination as to whether a detail constraint is attached to a concept is made at box 658. If so, at box 660 the detail file column is chosen. However, columns from tables selected by any data class-to-table rule are not deleted, as indicated at box 662. Thus, for example, if the query states "show max, min, average invoice for March" and "show each sales for March", the test for detail file preference rule will select the SALES-DATE column from the sales transaction file over the MARCH-SALES column from a similar summary file. After the detail file preference testing, control is passed to box 668 via boxes 664 and 666.

At this point, the remaining candidate columns are tested for summary file preference. Summary file columns with an associated time frame are preferred to transaction file columns with a time data type. As indicated at box 670, a determination is made as to whether any candidate columns include time attributes. The time attribute may be either a relative or absolute time. If so, control passes to box 672 and the columns from tables with such columns are preferred over columns from tables without time attributes, unless the table was selected by a data class rule (i.e., at box 618 of FIG. 6a). The result of a summary file preference rule test is illustrated by the query "show year-to-date sales by product". The summary file preference rule will select the YTD-SALES-$ column from the sales summary file over the SALES-DATE column from the sales transaction file.

The next heuristic rule results in the elimination of foreign-key-only tables as indicated at box 674. For each concept, if there are candidate columns for more than one table, and at least one of the candidate columns is a non-foreign key field, then any candidate columns from key-only tables are eliminated. These steps are indicated at boxes 676, 678, and 680 of FIG. 6c. This rule helps to minimize the number of selected tables by selecting columns from key-only tables only where there are no candidate columns from non-key-only tables. The rule is necessary to prevent errors during table minimization in the next rule (box 682). The application of the eliminate key-only tables rule is illustrated by the query "count salesmen and customers", where SALES_BY_CUST columns are eliminated from consideration and the preferred candidate set will be:

CUSTOMER - CUST.CUST#, SALES_BY_CUST.CUST#
SALESMAN - SLM.SLM#, SALES_BY_CUST.SLM#

The next rule, indicated at box 682, minimizes the remaining tables. For each table in the candidate set, a number of slots that contain at least one candidate column data structure from the table (among the candidate columns remaining in the candidate set) is counted. For each concept, if there are candidate columns for more than one table, the columns in the table with the highest count are chosen. These steps are indicated at boxes 684 and 686 of FIG. 6c.

After the tables are minimized, the best navigation path is chosen as indicated at box 688. In accordance with this rule, a determination is made at box 690 as to whether concepts with columns from multiple tables remain. If so, at box 692 the set of all possible combinations of tables is created At box 702 of FIG. 6d, a determination is made as to whether multiple tables were selected by a concept (e.g., data class-to-table rule), and if so only navigation paths with all those tables are tested as indicated at box 704. Then, at box the candidate navigation paths are ordered in accordance with the following rules, which are successively applied until only one final path remains:
1. candidates for which an actual navigation path is found;
2. candidates with fewer tables in the navigation path;
3. candidates with more primary key columns in the navigation path (e.g., select SLM# from SLM Master rather than CUST Master);
4. candidates for which the total number of primary key columns in all tables of the path is fewest;
5. candidate paths for which the sum of the candidate column-join column domain levels (i.e., hierarchy levels) of the candidate columns is lowest; and
6. candidate paths for which the sum of the estimated number of rows in the tables is fewest.

Any candidate columns from tables not satisfying the rule set forth are deleted at each step in the above ordering. This step is indicated at box 708 of FIG. 6d. If, after applying all of these rules, more than one candidate path remains, any one of the remaining paths may be chosen arbitrarily.

At box 710, the columns to be displayed in response to the query are added. This is essentially a formatting routine so that the report produced will be in a form predefined by the database developer when the knowledge base is built. Interestingly, this step may introduce new tables for the navigator, and as a result, the navigator will have to be called once more to produce the final navigation path. Thus, at box 712 a determination is made as to whether new tables have been introduced, and if so, control returns back to box 688 as indicated at box 714.

Finally, the break levels for the columns are computed at box 716, and stored at box 718, to establish the ordering of the output of data responsive to the query. The query language generator 38 (FIG. 1) will make use of the break level data in producing the meta query language.

At box 720, the column selection routine ends. It is noted that throughout the column selection routine, rules are successively applied to columns to narrow down the candidate set to an optimal set, deleting unnecessary, redundant columns along the way.

It will now be appreciated that the present invention provides a versatile database retrieval system having a natural language interface. End users need only describe the information they want as the request would be described to another person. There is no need for a database manager to provide technical support, and the end user does not need technical expertise in query syntax or database structure and nomenclature. Access to data in response to a natural language query is immediate.

Using a concept known as "conceptual dependency", the system interprets questions posed in a natural language, such as conversational English. It infers not only what is asked, but what is needed to answer the query. Appropriate data is located in the database, efficiently retrieved, and an intelligible report is presented immediately. These results are accomplished largely through the meaning representation of the information sought. The meaning representation is provided in both an internal form for use by the system, and in an external form which is easily understandable to a developer. In addition to being easily understandable, the external meaning representation (like the internal meaning representation) is canonical and database independent. The provision of such an external meaning representation is a significant advance in the art, enabling a database developer with no experience in artificial intelligence principles to provide a knowledge base that successfully enables the proper data to be retrieved in response to a natural language query.

The system and method of the present invention also provide a sophisticated developer tool kit enabling a database developer to build an application specific knowledge base, as well as a set of heuristic rules for identifying an optimal set of database elements to satisfy a query.

The information in the knowledge base includes descriptions of all the columns and tables in the database, using the same symbols as the external meaning representation. In addition, rules for aggregating the data elements and matching them to the meaning representation are provided in order to generate an efficient report program. In generating the optimal retrieval program to find the data required to satisfy a query, the system captures the knowledge in the knowledge base to create a conceptual road map of the database which guides the retrieval process.

A software listing implementing the system of the present invention is attached hereto as a microfiche appendix. The program listing is a hexadecimal dump of the object code, and is implemented for use with the ORACLE relational database management system on DEC VAX and Micro VAX computers available from Digital Equipment Corporation of Maynard, Mass., under the VMS operating system.

Although the present invention has been described in connection with a preferred embodiment thereof, many variations and modifications can be made. It is intended to cover all such variations and modifications that fall within the scope of the present invention, as defined in the following claims.

APPENDIX A

Internal Meaning Representation Grammar

```
mr                      → request-cd | retrieve-cd request-cd              → (REQUEST) | (REQUEST request-slot-filler-pair+)

request-slot-filler-pair → request-attribute   request-attribute-value request-attribute       → REFERENCE | AGGREGATE request-attribute-value → (reference-value-cd+)    | (aggregate-value-cd)
                          | (comparison-agg-cd)    | ()

reference-value-cd      → (ch-reference (ref-slot-filler-pair+) | ()

ch-attribute            → attributes-in-ch-attribute-defobj | db-att ch-attribute-value      → ch-reference            → DB-REFERENCE ref-slot-filler-pair    → ref-slot    (ref-slot-value-cd+)

ref-slot                → DISPLAY-SLOTS | CONSTRAINED-SLOTS display-slots-ref-slot-value-cd → (ch-attribute FILLER ch-attribute)

constrained-slots-ref-slot-value-cd → (ch-attribute  FILLER
                                       (ch-attribute ST constraint-def))
```

```
constraint-def  → (constraint+) | (OR  ARG   (constraint   constraint+))

constraint      → comparison-constraint | superlative-constraint |
                  time-constraint | specifier comparison-constraint → (comparison-constraint-type  ARG  constraint-
                         value)
                        (comparison-constraint-type  ARG  constraint-
                         value  BY constraint-by-value)

constraint-value      → (number) | constant | reference-value-cd constraint-by-value   → (number) | constant
```

APPENDIX B

External Meaning Representation

DISPLAY CONCEPTS

The external meaning representation indicates what developer-defined concepts are referred to in the query. The following example contains the concepts CUSTOMER and CUST-BALANCE:

| Query | Meaning Representation |
|---|---|
| "Show customer balances" | CUSTOMER:<br>CUST-BALANCE: |

SELECTION

Selection criteria are displayed following the concept, e.g.

| Query | Meaning Representation |
|---|---|
| "Show products with quantity on hand > 500" | PRODUCT:<br>"quantity on hand": > 500 |

FORMATTING

Formatting requests are indicated as follows:

| Query | Meaning Representation |
|---|---|
| "Show sales by customer and product" | SALES:<br>CUSTOMER: SORT(1)<br>PRODUCT: SORT(2) |

| Query | Meaning Representation |
|---|---|
| "List customers by sales in descending order" | SALES: SORT(1),DESCENDING<br>CUSTOMER: |

| Query | Meaning Representation |
|---|---|
| "Rank my best 5 customers in terms of sales" | SALES: SORT(1),DESCENDING,TOP(5)<br>CUSTOMER: |

Appendix A

```
constant         → (constant-type = literal-value)

literal-value    → (number) | (string)

constant-type    → ALPHA | PERCENT | LOC | LENGTH | CURRENCY | NUMBER comparison-constraint-type → < | <= | = | >= | > | <> superlative-constraint  → QUALITY-AVERAGE |
                          SORT-SPEC sort-spec-slot-filler-pair+ |
                          SORT-SPEC sort-spec-slot-filler-pair → (TO number-constant)? | (DIR ((BOTTOM-UP)
                             | (TOP-DOWN) | (NORMAL) | (REVERSE) })?

(SHOWING reference-value-cd)? |
                             (EXPLICIT ( (EXPLICIT) | (RANK))}? |
                             (SORT-ORDER number constant)?

time-constraint → (TB-CURRENT) | (TB-WTD) |(TB-WEEK) ORIGIN (-? number)
                         MTD         MONTH
                         YTD         YEAR
                         QTD         DAY
                         LYTD        PERIOD
                         PYTD        QUARTER
                  (TIME (FROM date-value)? (TO date-value)?) |
                  (TB-RANGE-REL FROM date-value TO date-value UNIT
                   time-unit
                  (TB-LENGTH = (number) UNIT (time-unit)) |
                  (TB-DAY-OF-WEEK  DAY  (number) ORIGIN  (number))

time-constraint → POINT | RANGE aggregate-value-cd → (ch-aggregate RESULT-NAME ((string))
                                   OP1 (aggregate | comparison-agg |
                                        reference-value-cd)
                                   OP2 (aggregate | comparison-agg |
                                        reference-value-cd) )

comparison-agg-cd → (ch-comparison-agg RESULT-NAME ((string))
                                   OP1 (aggregate | comparison-agg
                                        | reference-value-cd)
                                   OP2 (aggregate | comparison-agg
                                        | reference-value-cd)
                                   BY  constant   )

ch-aggregate    → ADD | SUBTRACT | MULTIPLY | DIVIDE | PERCENT |
                  AVERAGE | COMPARISON | ABS-VAL-OF ch-comparison-agg → GT-AGG | LT-AGG | GT-PCT-AGG | LT-PCT-AGG
```

Appendix B

MODIFIERS

Modifiers are semantic modifiers that are represented similarly to constraints. For example:

| Query | Meaning Representation |
|---|---|
| "List each invoice" | INVOICE: EACH |

Examples of modifiers that could be built into the General English Lexicon of the system include:

| Words | Modifier |
|---|---|
| "detail" | DETAIL |
| "each", "every" | EACH |

| Words | Modifier |
|---|---|
| "all" | ALL |
| "location", "where" | LOCATION |
| "should I", "can I", "will I" | EXPERT |
| "last" | LAST |
| "number" | NUMBER |
| "status", "flag" | STATUS |
| "frequent", "frequency" | FREQUENT |
| "rate" | RATE |
| "total" | TOTAL |
| "unit" | UNIT |
| "history" | HISTORY |
| "type", "class", "kind", "sort of" | CLASS |
| "code" | CODE |
| "future" | FUTURE |
| "miscellaneous" | MISCELLANEOUS |

Modifiers can also be developer-defined.

DATATYPES

Certain words are interpreted by the Natural Language Interface as referring to datatypes. Examples include the following:

| Words | Datatype |
|---|---|
| "value", "dollar", "amount", "$", "buck" | DOLLAR |
| "amount", "size", "count", "quantity", "number of", "volume" | COUNT |
| "percent", "%" | PERCENT |

TIME

The time period covered by a column is represented as follows:

| Query | Meaning Representation |
|---|---|
| "Show ytd sales" | SALES: TIME(YTD) |

Legal time specifications include:

| Words | Time |
|---|---|
| "n days ago" | DAY(-n) |
| "n days from now" | DAY(+n) |
| "n weeks ago" | WEEK(-n) |
| "n weeks from now" | WEEK(+n) |
| "n months ago" | MONTH(-n) |
| "n months from now" | MONTH(+n) |
| "n periods ago" | PERIOD(-n) |
| "n periods from now" | PERIOD(+n) |
| "n quarters ago" | QUARTER(-n) |
| "n quarters from now" | QUARTER(+n) |
| "n years ago" | YEAR(-n) |
| "n years from now" | YEAR(+n) |
| "since ..." <time> is any of above | SINCE,<time> |
| "before ..." <time> is any of above | BEFORE,<time> |
| "from ... to ..." <time1> and <time2> are any of above values | RANGE,<time1>,<time2> |

```
"wtd", "week to date"         WTD
"mtd", "month to date"        MTD
"qtd", "quarter to date"      QTD
"ptd", "period to date"       PTD
"ytd", "year to date"         YTD
"lytd", "last year to date"   LYTD
"pytd", "previous year to
    date"                     PYTD
"January 1", "from Sept
    to Oct", ... (e.g. "Jan.
    1, 1985 - Feb. 15" --->
    ABSOLUTE (1/1/85, 2/15/85)  ABSOLUTE,dd/mm/yy,dd/mm/yy
```

What is claimed is:

1. A database retrieval system having a natural language interface, said system comprising:
   a computer processor;
   a natural language interface coupled to said computer processor;
   first means operatively associated with said computer processor for producing a database-independent, canonical, internal meaning representation of a natural language query entered into said natural language interface;
   second means operatively associated with said computer processor for identifying database elements that are necessary to satisfy the query represented by said internal meaning representation;
   third means operatively associated with said computer processor for generating a database query among database elements identified by said second means, said database query enabling the retrieval and aggregation of data from a database to satisfy said natural language query; and
   debugging means for deriving an external meaning representation from said internal meaning representation, wherein said external meaning representation is provided in a form that can be easily understood by a database developer;
   said external meaning representation enabling a database developer to comprehend the internal meaning representation and verify that a natural language query entered into the natural language interface is properly interpreted to enable the correct retrieval and aggregation of data from said database.

2. The database retrieval system of claim 1 wherein said external meaning representation comprises entities and constraints relating to the entities, without reference to factual or linguistic relationships between entities that would prevent the external meaning representation from being easily understood by a database developer.

3. The database retrieval system of claim 2 further comprising:
   means for displaying the external meaning representation to the database developer.

4. The database retrieval system of claim 1 further comprising:
   tool kit means coupled to said computer processor for enabling the database developer to create a knowledge base containing a structural description and a semantic description of a database from which data is to be retrieved; and
   wherein said second means comprises an expert system coupled to access structural and semantic description information in said knowledge base and identify said database elements from said information in accordance with predefined rules.

5. The database retrieval system of claim 4 wherein said database structure is columnar, and said semantic description comprises a concept index of database columns.

6. The database retrieval system of claim 5 wherein said semantic description further comprises a time frame, value unit of measure, and aggregation level of database columns.

7. The database retrieval system of claim 4 further comprising:
   means for enabling a database developer to view the external meaning representation produced by said debugging means.

8. The database retrieval system of claim 7 wherein said debugging means comprise means for producing a representation of the database elements identified by said second means for viewing by a database developer.

9. The database retrieval system of claim 8 wherein said debugging means also enables a database developer to view the database query generated by said third means.

10. The database retrieval system of claim 4 wherein said external meaning representation comprises entities and constraints relating to the entities, without reference to factual or linguistic relationships between entities that would prevent the meaning representation from being easily understood by a database developer.

11. The database retrieval system of claim 10 further comprising:
    means for enabling a database developer to view the external meaning representation produced by said debugging means.

12. The database retrieval system of claim 4 wherein said rules comprise steps for identifying an optimal set of database elements to satisfy the query represented by the internal meaning representation.

13. The database retrieval system of claim 12 further comprising:
    means operatively associated with said computer processor for generating a formatted report containing data from said database responsive to said natural language query.

14. The database retrieval system of claim 12 wherein said steps for identifying an optimal set of database elements include:
    locating initial indexed columns;
    testing subtypes;
    testing data class-to-table rules;
    matching characteristics and constraints;
    matching time constraints;
    testing master table quantifiers;
    testing for detail file columns;

eliminating foreign-key-only tables;
minimizing tables; and
selecting the optimal navigation path for satisfying a query.

15. A database retrieval system having a natural language interface, said system comprising:
   a computer processor;
   tool kit means coupled to said computer processor for enabling a database developer to create a knowledge base containing a structural description and a semantic description of a database from which data is to be retrieved;
   a natural language interface coupled to said computer processor;
   means operatively associated with said computer processor for producing a database-independent, canonical, internal meaning representation of a natural language query entered into said natural language interface;
   expert system means for accessing structural and semantic description information in the knowledge base, and using said information to identify database elements that are necessary to satisfy the query represented by said internal meaning representation; and
   means operatively associated with said computer processor for generating a database, query among database elements identified by said expert system means, said database query enabling the retrieval and aggregation of data from a database to satisfy said natural language query.

16. The database retrieval system of claim 15 wherein said tool kit means comprises means for enabling a database developer to enter join criteria into said knowledge base.

17. The database retrieval system of claim 15 wherein said tool kit means comprises means for enabling a database developer to enter data group definitions into said knowledge base.

18. The database retrieval system of claim 15 wherein said tool kit means comprises means for enabling a database developer to enter word and phrase associations into said knowledge base.

19. The database retrieval system of claim 15 wherein said tool kit means comprises means for enabling a database developer to add, delete, and modify subtypes in said knowledge base.

20. The database retrieval system of claim 15 wherein said tool kit means comprises means for enabling a database developer to add, modify and delete column references in said knowledge base.

21. The database retrieval system of claim 15 wherein said tool kit means comprises means for enabling a database developer to add, delete, and modify word-to-data class rules in said knowledge base.

22. The database retrieval system of claim 15 wherein said tool kit means comprises means for enabling a database developer to add, delete, and modify data class-to-table rules in said knowledge base.

23. The database retrieval system of claim 15 wherein said tool kit means comprises means for enabling a database developer to add, delete, and modify nominal data definitions in said knowledge base.

24. A method for retrieving data from a database comprising the steps of:
   inputting a natural language query to a computer processor;
   processing said query in said processor to produce an internal meaning representation thereof;
   identifying database elements that are necessary to satisfy the query represented by said internal meaning representation;
   generating a database query among the identified database elements, for use in the retrieval and aggregation of data from an application database to satisfy said natural language query; and
   deriving an external meaning representation from said internal meaning representation, to enable a database developer to comprehend the internal meaning representation and verify that a natural language query is properly processed to enable the correct retrieval of data from said database.

25. The method of claim 24 wherein said database elements comprise tables and columns in a relational database, and said identifying step comprises the steps of:
   locating an initial set of candidate columns that contain data responsive to the query represented by said internal meaning representation; and
   eliminating candidate columns from said initial set that:
      (a) contain a restriction not specified in said internal meaning representation, and
      (b) are also not directly referenced by a concept in the internal meaning representation.

26. The method of claim 25 wherein said identifying step comprises a plurality of additional steps subsequent to the identification of said database elements, said subsequent steps including:
   locating concepts in said internal meaning representation that have associated data class-to-table rules which specify tables applicable to the query represented by said internal meaning representation;
   testing candidate columns for each concept located in the preceding step to determine if they are included in at least one table specified by the associated data class-to-table rule; and
   eliminating candidate columns tested in said testing step that are not included in at least one table specified by the associated data class-to-table rule.

27. The method of claim 26 wherein said identifying step comprises, after the eliminating step of claim 26, the subsequent step of:
   eliminating candidate columns that provide semantic matches which are not as close as semantic matches provided by other candidate columns for each concept in said internal meaning representation.

28. The method of claim 27 wherein said identifying step comprises, after the eliminating step of claim 27, the subsequent steps of:
   determining whether any candidate columns contain an exact time match for a time period specified in the query represented by said internal meaning representation; and if so,
   eliminating redundant candidate columns that do not contain an exact time match.

29. The method of claim 28 wherein said identifying step comprises, after the eliminating step of claim 28, the subsequent steps of:
   determining if quantification is present in the query represented by the internal meaning representation; and if so:
      (i) locating concepts within a chain of quantification;

(ii) determining if any concepts located in step (i) index a primary key column of a table;

(iii) selecting any table to which step (ii) pertains as a source of data responsive to the associated concept; and (iv) selecting tables other than those selected in step (iii) as sources of data responsive to concepts located in step (i) that do not index a primary key column of a table.

30. The method of claim 29 wherein said identifying step comprises, after the steps of claim 29, the subsequent steps of:

locating concepts that have a detail constraint associated therewith;

selecting candidate columns having detail attributes as a source of data responsive to concepts located in the preceding step; and eliminating redundant candidate columns as sources of data responsive to concepts referred to in the preceding step unless the candidate columns are in tables previously selected on the basis of said data class-to-table rules.

31. The method of claim 30 wherein said identifying step comprises, after the eliminating step of claim 30, the subsequent steps of:

locating candidate columns that include time attributes;

noting tables in which the candidate columns located in the preceding step reside;

eliminating redundant candidate columns from tables other than those:

(i) noted in said noting step, or (ii) which are selected on the basis of said data class-to-table rules.

32. The method of claim 31 wherein said identifying step comprises, after the eliminating step of claim 31, the subsequent steps of:

locating concepts that have candidate columns from more than one table;

noting any candidate columns for a concept located in the preceding step that are non-foreign key fields; and if any columns are noted in the immediately preceding step, eliminating any candidate columns for the concept referred to in the immediately preceding step that are from key only tables.

33. The method of claim 32 wherein said identifying step comprises, after the steps of claim 32, the subsequent steps of:

determining, for each concept, if there are candidate columns from more than one table; and if so, eliminating redundant candidate columns from tables other than those with the highest count of such candidate columns.

34. The method of claim 33 wherein said identifying step comprises, after the steps of claim 33, the subsequent step of:

choosing a navigation path among the remaining tables and candidate columns for satisfying the query represented by the internal meaning representation.

35. The method of claim 34 wherein said step of choosing the navigation path comprises the steps of:

determining if there still exist concepts that have candidate columns from multiple tables; and if so:

(a) creating a set of all of the possible combinations of such tables, each combination representing a candidate navigation path, (b) determining whether the multiple tables associated with a concept were selected on the basis of a data class-to-table rule, and if so, deleting candidate navigation paths that do not include all of the tables required by the data class-to-table rule, (c) ordering the remaining candidate navigation patphs in accordance with predefined navigation path rules to obtain said navigation path for satisfying the query represented by the meaning representation.

36. The method of claim 35 wherein said predefined navigation path rules comprise:

(i) giving priority to paths within tables that have a predefined navigation path, (ii) giving priority to paths containing fewer tables;

(iii) giving priority to paths with more primary key columns;

(iv) giving priority to paths in which the total number of primary key columns in all tables in the path is fewest;

(v) giving priority to paths for which the sum of the hierarchy levels of the candidate columns is lowest;

(vi) giving priority to paths for which the sum of the estimated number of rows in the tables is fewest; and eliminating any candidate columns from tables that are not included in the highest priority navigation path resulting from the application of the above navigation path rules.

37. The method of claim 36 comprising, after the eliminating step of claim 36, the subsequent steps of:

adding table and column level columns to data from said database to be displayed;

determining if the adding step introduced new tables; and if so:

applying said navigation path rules again to produce a final navigation path.

38. The method of claim 24 comprising the further steps of:

building a knowledge base representative of said application database; and enabling the developer to modify the knowledge base, to correct an erroneous query interpretation represented by the external meaning representation.

39. A method for deriving, from an internal meaning representation produced by a natural language computer interface, an external meaning representation for use in debugging said interface by allowing a human being to comprehend a query interpretation represented by said internal meaning representation, comprising the steps of:

identifying entities contained in the internal meaning representation;

identifying constraints associated with the entities in the internal meaning representation; and combining said entities and constraints into an external meaning representation that can be easily comprehended by a human being.

40. The method of claim 39 comprising the further step of:

deriving said internal meaning representation from a database query;

wherein said external meaning representation is canonical, indicative of said database query, and is database independent.

41. The method of claim 39 comprising the further step of:

ignoring factual or linguistic relationships between entities in the internal meaning representation that would prevent the external meaning representation from being easily comprehended by a human being if included therein.

* * * * *